United States Patent
Ebara et al.

(10) Patent No.: US 11,630,734 B2
(45) Date of Patent: Apr. 18, 2023

(54) SCALE-OUT STORAGE SYSTEM AND STORAGE CONTROL METHOD

(71) Applicant: Hitachi, Ltd., Tokyo (JP)

(72) Inventors: Hiroto Ebara, Tokyo (JP); Akira Yamamoto, Tokyo (JP); Yoshinori Ohira, Tokyo (JP); Takahiro Yamamoto, Tokyo (JP); Masakuni Agetsuma, Tokyo (JP); Tatsuya Hirai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/474,395

(22) Filed: Sep. 14, 2021

(65) Prior Publication Data
US 2022/0269567 A1 Aug. 25, 2022

(30) Foreign Application Priority Data
Feb. 19, 2021 (JP) ............... JP2021-025696

(51) Int. Cl.
*G06F 11/00* (2006.01)
*G06F 11/14* (2006.01)
(Continued)

(52) U.S. Cl.
CPC ...... *G06F 11/1435* (2013.01); *G06F 11/0772* (2013.01); *G06F 11/1658* (2013.01); *G06F 11/2023* (2013.01)

(58) Field of Classification Search
CPC ............ G06F 11/0772; G06F 11/1435; G06F 11/1658; G06F 11/202; G06F 11/2023; G06F 11/2028; G06F 11/2035
See application file for complete search history.

(56) References Cited

U.S. PATENT DOCUMENTS

2002/0178162 A1\* 11/2002 Ulrich ................. G06F 16/10
709/219
2003/0074417 A1 4/2003 Kasako et al.
(Continued)

FOREIGN PATENT DOCUMENTS

JP 2003-084917 A 3/2003
JP 2003-208362 A 7/2003
(Continued)

OTHER PUBLICATIONS

Notice of Reasons for Refusal, dated Jan. 5, 2023, for Japanese Application No. 2021-025696 (with English translation).

*Primary Examiner* — Michael Maskulinski
(74) *Attorney, Agent, or Firm* — Baker Botts L.L.P.

(57) ABSTRACT

A scale-out storage system includes a plurality of computer nodes each of which has a memory and a processor, and a storage apparatus. The computer nodes have one or more redundancy groups each of which is a group for metadata protection. Each of the one or more redundancy groups includes two or more of the computer nodes including a primary node being a primary computer node and a secondary node being a secondary computer node, and a failover is performed from the primary node to the secondary node. The memory of the primary node has stored therein metadata related to the redundancy group and to be accessed for control. The metadata is redundantly stored in the memory of the primary node and the memory of the secondary node.

10 Claims, 20 Drawing Sheets

(51) Int. Cl.
*G06F 11/16* (2006.01)
*G06F 11/20* (2006.01)
*G06F 11/07* (2006.01)

(56) References Cited

U.S. PATENT DOCUMENTS

| | | |
|---|---|---|
| 2003/0135782 A1 | 7/2003 | Matsunami et al. |
| 2005/0050288 A1 | 3/2005 | Takahashi et al. |
| 2005/0091448 A1 | 4/2005 | Nakatani et al. |
| 2009/0077134 A1 | 3/2009 | Ueoka et al. |
| 2015/0127854 A1 | 5/2015 | Yamamoto et al. |
| 2019/0163593 A1 | 5/2019 | Agetsuma et al. |
| 2019/0205151 A1* | 7/2019 | Suzuki ................ G06F 9/45558 |
| 2019/0278746 A1* | 9/2019 | Cree .................. G06F 11/2023 |

FOREIGN PATENT DOCUMENTS

| | | |
|---|---|---|
| JP | 2005-078453 A | 3/2005 |
| JP | 2005-128861 A | 5/2005 |
| JP | 2009-070143 A | 4/2009 |
| JP | 6114397 B2 | 4/2017 |

* cited by examiner

FIG.1
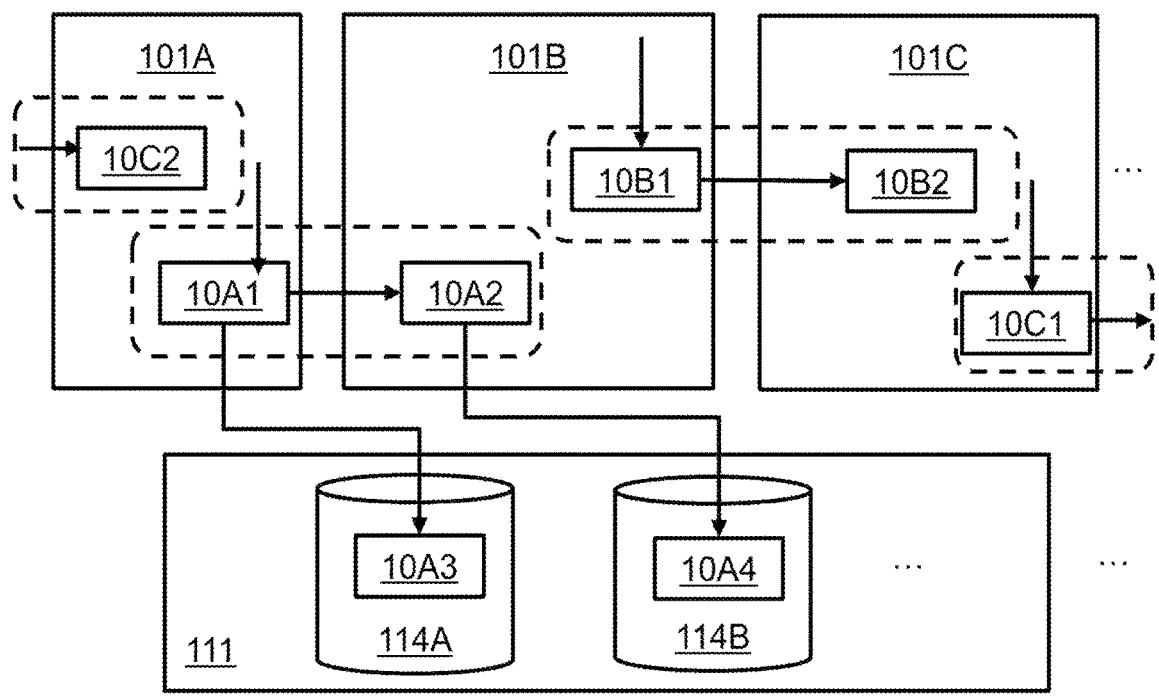
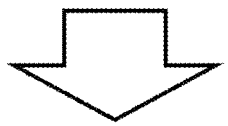
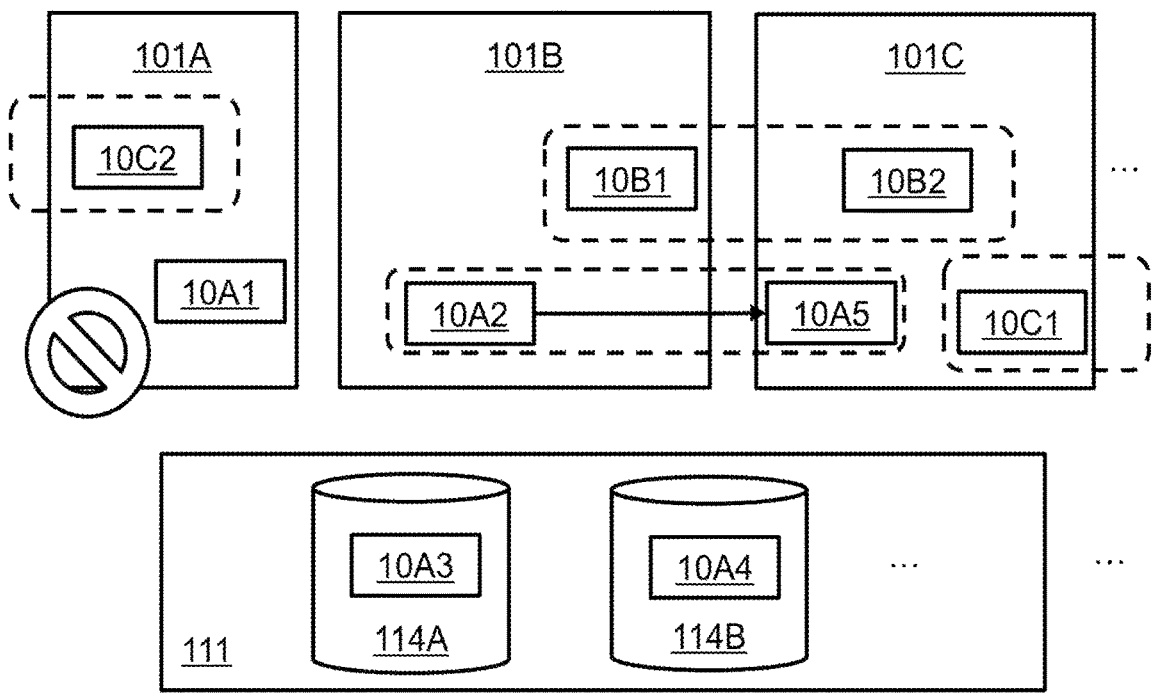

FIG. 3

MEMORY 102

TABLE REGION 201
- NODE TABLE 211
- STORAGE BOX TABLE 212
- PERMANENT STORAGE DEVICE TABLE 213
- PORT TABLE 214
- VOLUME TABLE 215
- BLOCK MAPPING TABLE 216
- METADATA TABLE 217
- METADATA MAPPING TABLE 218

PROGRAM REGION 301
- USER DATA READ PROCESS PROGRAM 311
- USER DATA WRITE PROCESS PROGRAM 312
- METADATA READ PROCESS PROGRAM 313
- METADATA WRITE PROCESS PROGRAM 314
- FAILOVER PROCESS PROGRAM 315
- REBUILD PROCESS PROGRAM 316

FIG.4

MEMORY 113

TABLES 202
- PERMANENT STORAGE DEVICE TABLE 213
- PORT TABLE 214

PROGRAMS 302
- READ PROCESS PROGRAM 361
- WRITE PROCESS PROGRAM 362

FIG. 5A

| NODE TABLE 211 |
|---|
| ID 2111 |
| STATUS 2112 |
| PERMANENT STORAGE DEVICE LIST 2113 |
| PORT LIST 2114 |

FIG. 5B

| STORAGE BOX TABLE 212 |
|---|
| ID 2121 |
| STATUS 2122 |
| PERMANENT STORAGE DEVICE LIST 2123 |
| PORT LIST 2124 |

FIG. 5C

| PERMANENT STORAGE DEVICE TABLE 213 |
|---|
| ID 2131 |
| STATUS 2132 |
| NODE ID/STORAGE BOX ID 2133 |
| BLOCK MAPPING LIST 2134 |

FIG. 5D

| PORT TABLE 214 |
|---|
| ID 2141 |
| STATUS 2142 |
| NODE ID/STORAGE BOX ID 2143 |
| ADDRESS LIST 2144 |

FIG. 5E

| VOLUME TABLE 215 |
|---|
| ID 2151 |
| NODE ID 2152 |
| HOST INFORMATION 2153 |
| BLOCK MAPPING LIST 2154 |

FIG. 5F

| BLOCK MAPPING TABLE 216 |
|---|
| ID 2161 |
| LOGICAL REGION LIST 2162 |
| PHYSICAL REGION LIST 2163 |

FIG. 5G

| METADATA TABLE 217 |
|---|
| ID 2171 |
| TYPE 2172 |
| PRIMARY NODE ID 2173 |
| SECONDARY NODE ID LIST 2174 |
| METADATA MAPPING LIST 2175 |

FIG. 5H

| METADATA MAPPING TABLE 218 |
|---|
| ID 2181 |
| METADATA ID 2182 |
| PHYSICAL REGION LIST 2183 |

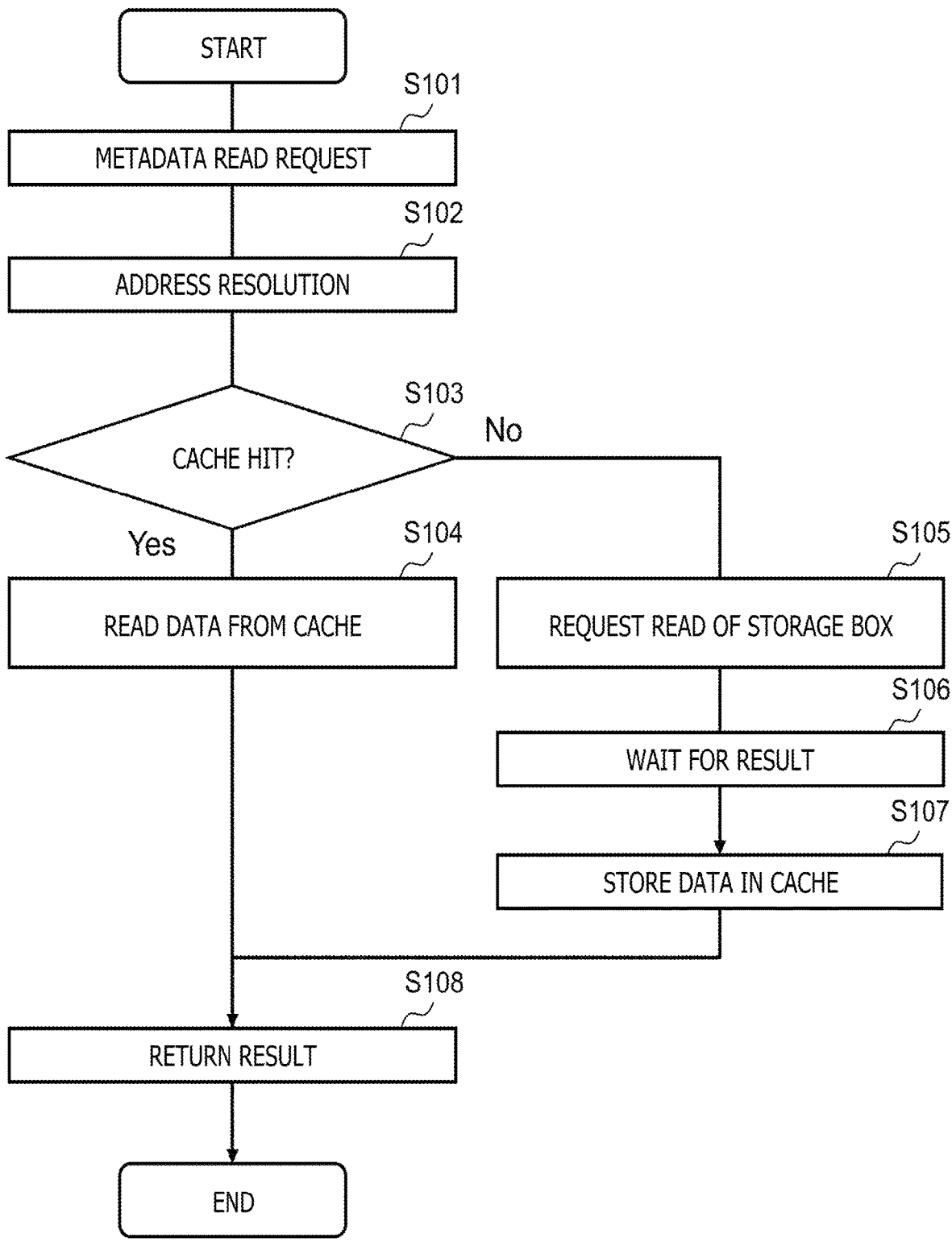

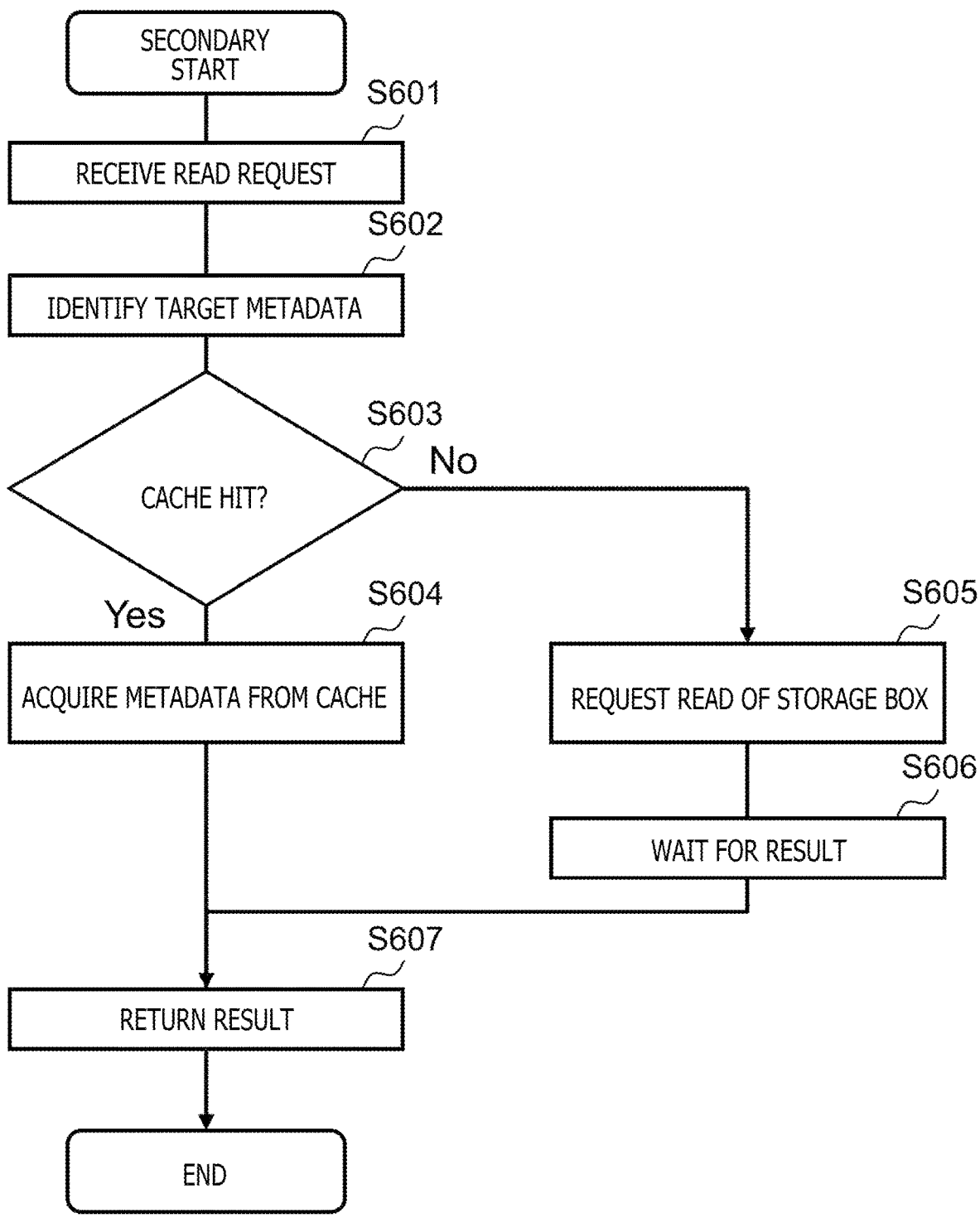

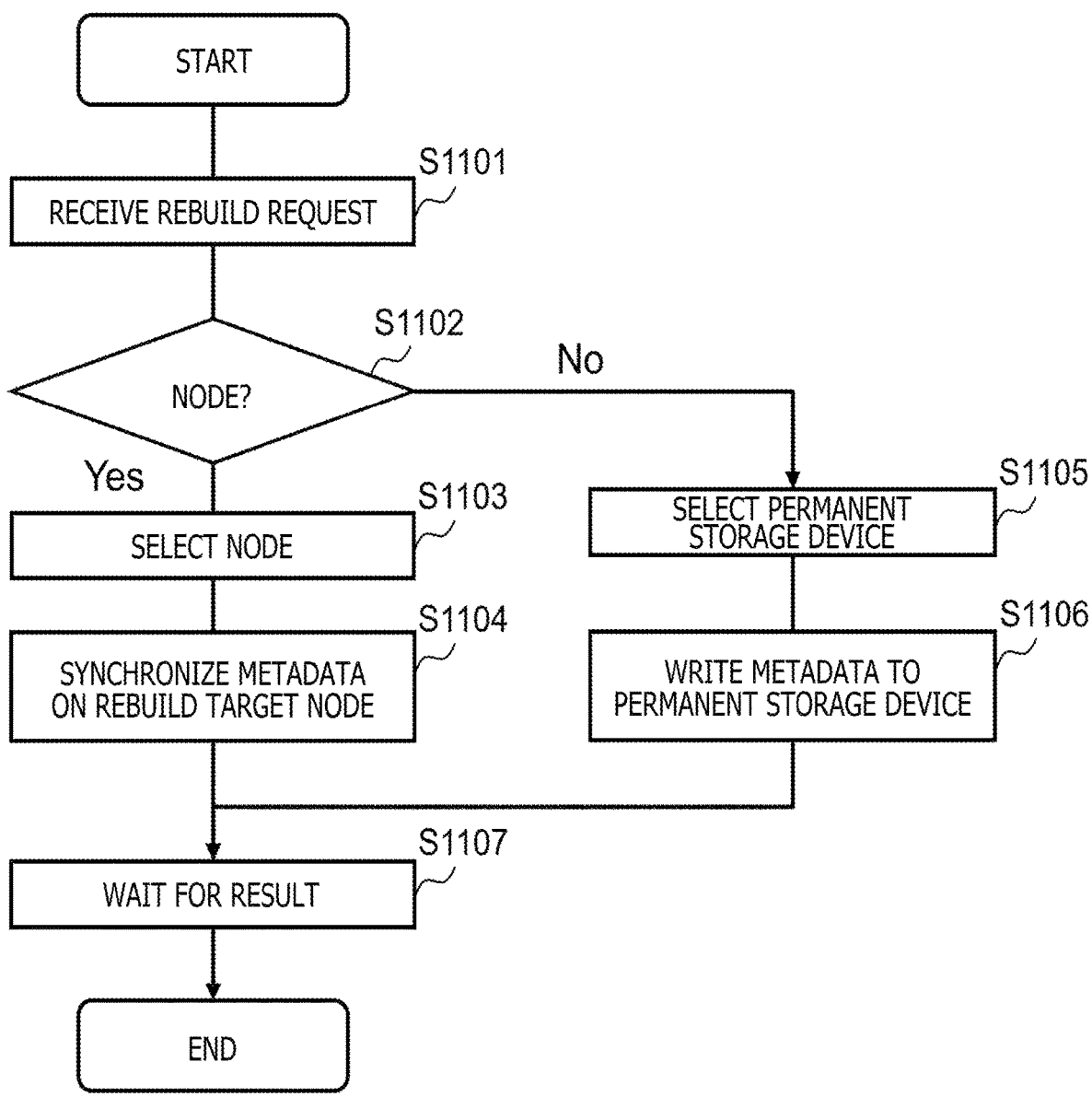

SCALE-OUT STORAGE SYSTEM AND STORAGE CONTROL METHOD

BACKGROUND OF THE INVENTION

1. Field of the Invention

The present invention relates generally to storage control of a scale-out storage system.

2. Description of the Related Art

Scale-out storage systems are known. A system described in US 2019/0163593, for example, is a system in which a plurality of computer nodes each having a storage device are connected to one another via a network. A system described in Japanese Patent No. 6114397 is a system in which a plurality of storage systems share a plurality of storage boxes.

In a scale-out storage system, each of computer nodes performs control on the basis of metadata. In each computer node, the metadata includes data necessary for control performed by the computer node, e.g., data indicating the configuration of the storage system, data (e.g., an ID (e.g., a logical unit number (LUN)) of a logical volume) indicating the location of user data (e.g., data inputted or outputted in response to an input/output (I/O) request from an application) accessible to the computer node, and an address (e.g., a logical block address (LBA)) of an in-volume region.

In the scale-out storage system, when a failure has occurred in one of the computer nodes, a failover to another one of the computer nodes is performed, and the metadata is referred to for the failover. The metadata is referred to when necessary in control other than the failover as well. Thus, proper protection of the metadata in the scale-out storage system is desirable.

SUMMARY OF THE INVENTION

A scale-out storage system according to an embodiment of the present invention includes a plurality of computer nodes each of which has a memory and a processor, and a storage apparatus having a plurality of permanent storage devices and connected to the plurality of computer nodes. The plurality of computer nodes have one or more redundancy groups each of which is a group for metadata protection. Each of the one or more redundancy groups includes two or more of the computer nodes including a primary node being a primary computer node and a secondary node being a secondary computer node, and a failover is performed from the primary node to the secondary node. The memory of the primary node has stored therein metadata related to the redundancy group and to be accessed for control, and the metadata is redundantly stored in different ones of the permanent storage devices in the storage apparatus. The metadata is redundantly stored in the memory of the primary node and the memory of the secondary node.

The scale-out storage system according to an embodiment of the present invention is able to achieve proper protection of the metadata.

BRIEF DESCRIPTION OF THE DRAWINGS

FIG. 1 illustrates an outline of a metadata write process according to a first embodiment of the present invention;

FIG. 3 illustrates an example configuration of a memory of a node;

FIG. 4 illustrates an example configuration of a memory of a storage box;

FIG. 5A illustrates an example structure of a node table;

FIG. 5B illustrates an example structure of a storage box table;

FIG. 5C illustrates an example structure of a permanent storage device table;

FIG. 5D illustrates an example structure of a port table;

FIG. 5E illustrates an example structure of a volume table;

FIG. 5F illustrates an example structure of a block mapping table;

FIG. 5G illustrates an example structure of a metadata table;

FIG. 5H illustrates an example structure of a metadata mapping table;

FIG. 6 is a flowchart of a user data read process according to the first embodiment;

FIG. 9B is a flowchart of a process performed by a secondary node in the metadata read process according to the first embodiment;

FIG. 12 is a flowchart of a rebuild process according to the first embodiment;

DESCRIPTION OF THE PREFERRED EMBODIMENTS

Figure 2:
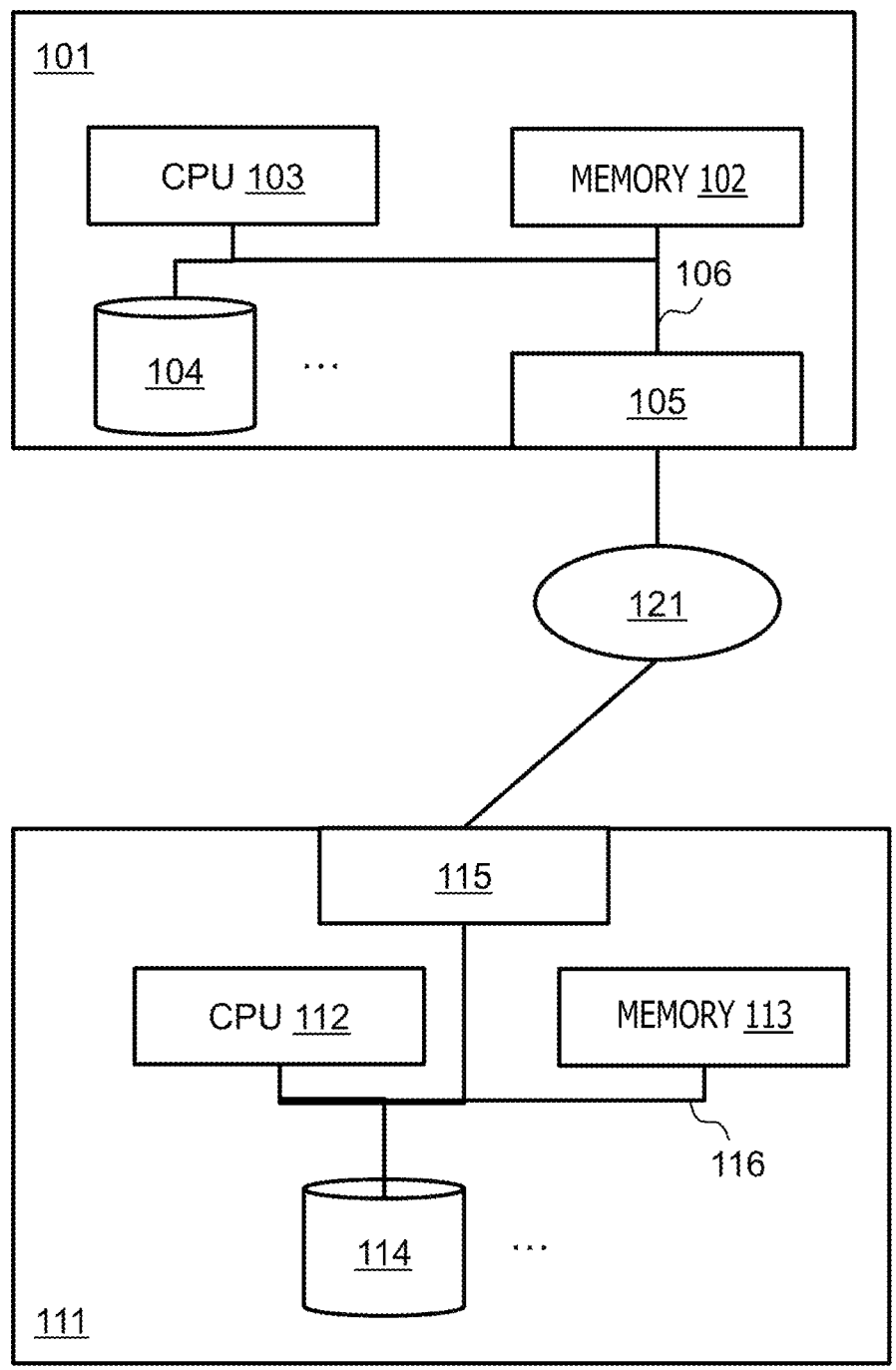
FIG. 2 illustrates an example configuration of a storage system according to the first embodiment.

Hereinafter, embodiments of the present invention will be described with reference to the accompanying drawings. It should be understood that the embodiments described below are not meant to limit the invention recited in the claims, and that all elements and combinations thereof described in the following description of the embodiments are not necessarily essential to the present invention.

In the following description, the term "interface apparatus" may mean one or more communication interface devices. The one or more communication interface devices may be one or more communication interface devices of the same type (e.g., one or more network interface cards (NICs)), or two or more communication interface devices of different types (e.g., an NIC(s) and a host bus adapter(s) (HBA(s))).

In the following description, the term "memory" may mean one or more memory devices, and may typically mean a main storage device(s). At least one of the memory devices in a memory may be a volatile memory device or a nonvolatile memory device.

In the following description, the term "permanent storage apparatus" may mean one or more permanent storage devices, which are an example of one or more storage devices. Each permanent storage device may typically be a nonvolatile storage device (e.g., an auxiliary storage device), and specifically, may be a hard disk drive (HDD), a solid state drive (SSD), a non-volatile memory express (NVME) drive, or a storage class memory (SCM), for example.

In the following description, the term "storage apparatus" may mean a permanent storage apparatus, or a memory and a permanent storage apparatus.

In the following description, the term "processor" may mean one or more processor devices. At least one of the processor devices may typically be a microprocessor device such as a central processing unit (CPU), but may alternatively be a processor device of another type such as a graphics processing unit (GPU). At least one of the processor devices may be a single-core processor device or a multi-core processor device. At least one of the processor devices may be a processor core. At least one of the processor devices may be a processor device in a broad sense, such as a circuit device including a collection of gate arrays that implements a part or the whole of a process using a hardware description language (e.g., a field-programmable gate array (FPGA), a complex programmable logic device (CPLD), or an application-specific integrated circuit (ASIC)).

In the following description, a "program" may be used as a subject in a description of a process, but a process that is described with a program as a subject may be a process performed by a processor or an apparatus having the processor. In addition, two or more programs may be implemented as one program, and one program may be implemented as two or more programs. A program may be installed from a program source. The program source may be, for example, a program delivery computer or a computer-readable recording medium (e.g., a nontemporary recording medium). Descriptions of functions below are only examples, and two or more of the functions may be integrated into one function, or one of the functions may be divided into a plurality of functions.

In the following description, an expression like "xxx table" may be used to describe information that provides an output in response to an input, and such information may be a table having any structure, or a learning model typified by a genetic algorithm, a random forest, or a neural network that produces an output in response to an input. Therefore, an "xxx table" can alternatively be expressed as "xxx information." The structure of each of tables described below is an example, and one of the tables may be divided into two or more tables, and the whole or a part of two or more of the tables may be one table.

In the following description, when elements of the same type are described without being distinguished from each other, a shared portion of reference symbols thereof may be used, whereas when elements of the same type are described while being distinguished from each other, reference symbols thereof in their entirety may be used.

In addition, "data" is generally treated as an uncountable noun, but in the following description, at least "metadata" may be used as a countable noun for the sake of convenience.

First Embodiment

A first embodiment of the present invention is directed to a scale-out storage system in which computer nodes share a storage box. In this scale-out storage system, at least one storage box is connected to a plurality of computer nodes via a network. The computer nodes manage the storage box(es) and permanent storage devices installed in the box(es), thus realizing a virtual storage system. Here, each computer node may be referred to simply as a "node."

Data for realizing the storage system and data of a host are made permanent in the permanent storage devices. Here, the data for realizing the storage system may be referred to as "metadata," and the data of the host may be referred to as "user data." The metadata includes, for example, configuration information representing the configuration of the plurality of computer nodes and the one or more storage boxes in the storage system, monitoring information representing a result of monitoring the storage system, log information representing a log in the storage system, address information to be referred to in I/O processing for the user data (e.g., address translation information for each of logical volumes), and so on.

The node receives a write request to write user data from the host, and starts a write process of writing the user data. Here, the write process of writing the user data may be referred to as a "user data write process."

In the user data write process, the node performs a process for making write data accompanying the write request permanent on the permanent storage devices. In the write process, the user data to be written is redundantly and permanently stored in a plurality of permanent storage devices to protect the user data from a hardware failure or the like. In addition, the write process may be, for example, at least a part of a transaction process so that an incongruity in the user data will not occur even if the write process is interrupted at any time due to a power failure of the system or the like.

In the user data write process, the node performs a region allocation process of allocating a storage region based on the permanent storage devices to which the write is to be done, performs a process for making data necessary for the transaction permanent, and thereafter makes the user data permanent in the permanent storage devices.

In the user data write process, in each of the region allocation process of allocating the storage region based on the permanent storage devices to which the write is to be done, and the process for making the data necessary for the transaction permanent, a read process and a write process for the metadata required for the process are performed. Here, the read process and the write process for the metadata may be referred to as a "metadata read process" and a "metadata write process," respectively.

The node causes the metadata, as well as the user data, to be redundantly and permanently stored in the plurality of permanent storage devices.

Typically, the metadata is accessed frequently in a smaller unit than the user data. Accordingly, the node holds the metadata in a cache on a memory installed therein, and thus reduces the number of instances of I/O processing between the computer node and the permanent storage devices during each of the metadata read process and the metadata write process.

If a first node is closed due to a failure or the like, a second node takes over control over the metadata in the first node, implementing a failover process in the second node. For example, a redundancy group is formed, and the metadata is redundantly stored in memories of nodes that belong to the redundancy group.

FIG. 1 illustrates examples of outlines of a metadata write process, a failover process, and a rebuild process according to the present embodiment.

The scale-out storage system includes a plurality of nodes 101 (e.g., 101A, 101B, and 101C), and a storage box 111 (an example of a storage apparatus) connected to the plurality of nodes 101 and having a plurality of permanent storage devices 114 (e.g., 114A and 114B).

The plurality of nodes 101 have one or more redundancy groups, each of which is a group for protecting metadata 10. In the example illustrated in FIG. 1, a redundancy group is provided for each of metadata 10A, 10B, and 10C. The node 101A forms a redundancy group for the metadata 10A together with the node 101B, and with respect to the metadata 10A, the node 101A is a primary node, and the node 101B is a secondary node. The node 101B forms a redundancy group for the metadata 10B together with the node 101C, and with respect to the metadata 10B, the node 101B is a primary node, and the node 101C is a secondary node. The node 101C forms a redundancy group for the metadata 10C together with the node 101A, and with respect to the metadata 10C, the node 101C is a primary node, and the node 101A is a secondary node. In the present embodiment, with respect to each redundancy group, the primary node and the secondary node are defined as follows, for example.

The "primary node" refers to a node that has control over the metadata to be protected in the redundancy group, and is, for example, a node capable of updating the metadata. The primary node is a node from which a failover is performed.

The "secondary node(s)" refers to one or more nodes that exist in the redundancy group, and is a node to which a failover can be performed on the basis of the metadata to be protected in the redundancy group. After the failover, the secondary node is raised to the primary node. If a failure occurs in the new primary node, a failover may be performed therefrom to one of the remaining secondary nodes in the redundancy group.

An example of the metadata write process for the metadata 10A is as follows.

The node 101A receives a metadata write request, and stores "write metadata" (i.e., the whole or a part of the metadata updated) that accompanies the metadata write request in a cache (i.e., a part of the memory) thereof (that is, overwrites the metadata 10A in the memory of the node 101A). The node 101A transfers a write request to write the updated metadata 10A1 (or a difference between the updated metadata 10A1 and the metadata before being updated) to each of the secondary node 101B and the storage box 111. In the write request from the node 101A to the storage box 111, the permanent storage device 114A is specified.

The secondary node 101B stores data (i.e., the updated metadata 10A1 (or the difference between the updated metadata 10A1 and the metadata before being updated) that accompanies the received write request in a cache (i.e., a part of the memory) thereof (that is, overwrites the metadata 10A in the memory of the node 101B), and transmits a write request to write the updated metadata 10A2 (or a difference between the updated metadata 10A2 and the metadata before being updated) to the storage box 111. In the write request from the node 101B to the storage box 111, the permanent storage device 114B is specified. The secondary node 101B returns, to the node 101A, a completion response for the write request from the primary node 101A if a completion response for the write request to the storage box 111 is received from the storage box 111, and the caching of the data accompanying the write request from the primary node 101A has been completed.

According to the write request from the primary node 101A, the storage box 111 overwrites the metadata 10A in the permanent storage device 114A using data that accompanies the received write request, and returns a completion response for the write request to the node 101A. In addition, according to the write request from the secondary node 101B, the storage box 111 overwrites the metadata 10A in the permanent storage device 114B using data that accompanies the received write request, and returns the completion response for the write request to the node 101B. As a result, updated metadata 10A3 and 10A4 are stored in the permanent storage devices 114A and 114B, respectively, which are different from each other in the storage box 111. In other words, the metadata 10A is redundantly stored in different ones of the permanent storage devices 114.

The metadata write process is completed if the node 101A receives, from the storage box 111, the completion response for the write request to the storage box 111, and receives, from the node 101B, the completion response for the write request to the secondary node 101B.

For each item of metadata, the redundancy group is formed between two or more of the nodes. In the example illustrated in FIG. 1, the redundancy group for the metadata 10A is formed between the node 101A and the node 101B, the redundancy group for the metadata 10B is formed between the node 101B and the node 101C, and the redundancy group for the metadata 10C is formed between the node 101C and the node 101A, as described above.

Next, an example failover process and an example rebuild process that are performed when the node 101A has been closed due to a failure or the like will be described below. The node 101B acquires information that the node 101A has been closed, and is raised from the secondary node to the primary node. Thereafter, the node 101B selects the node 101C as a new secondary node in which a rebuild is to be performed, and transfers the metadata 10A2 to the memory of the node 101C. As a result, metadata 10A5 is stored in the memory of the node 101C, resulting in redundancy of the metadata 10A among the memories of the different nodes 101B and 101C.

FIG. 2 illustrates the physical configuration of the storage system according to the present embodiment.

The storage system includes the plurality of nodes 101, and the one or more storage boxes 111 connected to the plurality of nodes 101 via a network 121. The one or more storage boxes 111 are an example of the storage apparatus.

Each node 101 includes a CPU 103, a memory 102, a permanent storage device 104, and a port 105, which are physically connected to one another via a bus 106. The memory 102 may include at least one of a volatile memory and a non-volatile memory. The permanent storage device 104 is used to store programs that operate on the node 101, and to make data used by the programs permanent. Note that the permanent storage device 104 may not be installed in the node 101, and in the case where the permanent storage device is not installed therein, a piece of hardware capable of booting the node 101 without the need for the permanent storage device, such as a ROM for network booting, may be installed therein. The port 105 is an interface for connecting the node 101 to the network 121, and is, for example, an Ethernet network interface card (NIC) or the like (Ethernet is a registered trademark). The CPU 103 is an example of a processor, and the port 105 is an example of an interface apparatus.

The storage box 111 includes a CPU 112, a memory 113, the permanent storage devices 114, and a port 115, which are physically connected to one another via a bus 116. The memory 113 may include at least one of a volatile memory and a non-volatile memory. The permanent storage devices 114 are used to store programs that operate on the storage box 111, to make data used by the programs permanent, and to make the data used by the programs that operate on the node 101 permanent. The port 115 is an interface for connecting the storage box 111 to the network 121, and is, for example, an Ethernet network interface card (NIC) or the like. The port 115, the CPU 112, and the memory 113 may be an example of a controller of the storage box 111. The controller of the one or more storage boxes 111 may be an example of a storage controller of the storage apparatus.

The network 121 includes one or more apparatuses for physical interconnection between the nodes 101 and the storage box(es) 111, and includes, for example, an Ethernet network switch or the like.

FIG. 3 illustrates an example configuration of the memory 102 of the node 101.

The memory 102 includes a table region 201 in which tables are stored, and a program region 301 in which programs are stored.

Examples of the tables include a node table 211, a storage box table 212, a permanent storage device table 213, a port table 214, a volume table 215, a block mapping table 216, a metadata table 217, and a metadata mapping table 218. Examples of the programs include a user data read process program 311, a user data write process program 312, a metadata read process program 313, a metadata write process program 314, a failover process program 315, and a rebuild process program 316. Details of the tables and the programs will be described below.

In the present embodiment, the "metadata" may include at least a part of the tables 211 to 218. While the metadata is provided for each of the redundancy groups, at least a part of the metadata may be shared by two or more redundancy groups. In the present embodiment, a "control program" may be a program including the programs 311 to 316. Each node may have a plurality of control programs, and each redundancy group may include two or more control programs (e.g., one primary (active) control program and one or more secondary (standby) control programs) in two or more different nodes. If a node failure occurs, and the primary control program is in the node in which the failure has occurred, a failover may be performed from the primary control program to a secondary control program in another node that belongs to the same redundancy group as the primary control program. Each of a logical region and a physical region, which will be described below and which are accessible to each control program may be a region that belongs to a predetermined range permitted to the control program. The primary control program included in each redundancy group has control over (access to) the metadata for the redundancy group, but may not have control over the metadata for any other redundancy group.

FIG. 4 illustrates an example configuration of the memory 113 of the storage box 111.

The memory 113 includes a table region 202 in which tables are stored, and a program region 302 in which programs are stored.

Examples of the tables include a permanent storage device table 213 and a port table 214. Examples of the programs include a read process program 361 and a write process program 362. Details of the tables and the programs will be described below.

FIG. 5A illustrates an example structure of the node table 211.

The node table 211 has information as to each of the plurality of nodes 101, and includes entries of information as to the nodes 101. Each entry corresponds to one of the nodes 101. Information of the entry includes an ID 2111, a status 2112, a permanent storage device list 2113, and a port list 2114.

The ID 2111 is a value (e.g., a universally unique identifier (UUID)) capable of uniquely identifying the node 101. The status 2112 indicates the status (e.g., normal and closed) of the node 101. The permanent storage device list 2113 is a list of items of information (e.g., links to entries in the permanent storage device table 213) as to one or more permanent storage devices included in the node 101. The port list 2114 is a list of items of information (e.g., links to entries in the port table 214) as to one or more ports included in the node 101.

FIG. 5B illustrates an example structure of the storage box table 212.

The storage box table 212 includes an entry of information as to each of the one or more storage boxes 111. Each entry corresponds to one storage box 111. Information of the entry includes an ID 2121, a status 2122, a permanent storage device list 2123, and a port list 2124.

The ID 2121 is a value (e.g., a UUID) capable of uniquely identifying the storage box 111. The status 2122 indicates the status (e.g., normal and closed) of the storage box 111. The permanent storage device list 2123 is a list of items of information (e.g., links to entries in the permanent storage device table 213) as to each of the one or more permanent storage devices 114 included in the storage box 111. The port list 2124 is a list of items of information (e.g., links to entries in the port table 214) as to each of one or more ports included in the storage box 111.

FIG. 5C illustrates an example structure of the permanent storage device table 213.

The permanent storage device table 213 includes an entry of information as to each of the plurality of permanent storage devices. Each entry corresponds to one of the permanent storage devices. Information of the entry includes an ID 2131, a status 2132, a node ID/storage box ID 2133, and a block mapping list 2134.

The ID 2131 is a value (e.g., a UUID) capable of uniquely identifying the permanent storage device. The status 2132 indicates the status (e.g., normal and closed) of the permanent storage device. The node ID/storage box ID 2133 represents an ID of the node 101 or storage box 111 in which the permanent storage device is installed. The block mapping list 2134 is a list of items of information (e.g., links to entries in the block mapping table 216) corresponding to a physical region (i.e., a storage region provided by the permanent storage device) corresponding to a logical region (i.e., an in-volume region) of a volume (i.e., a logical volume).

FIG. 5D illustrates an example structure of the port table 214.

The port table 214 includes an entry of information as to each of a plurality of ports. Each entry corresponds to one of the ports. Information of the entry includes an ID 2141, a status 2142, a node ID/storage box ID 2143, and an address list 2144.

The ID 2141 is a value capable of uniquely identifying the port. The status 2142 indicates the status (e.g., normal and closed) of the port. The node ID/storage box ID 2143 represents an ID of the node 101 or storage box 111 in which the port is installed. The address list 2144 is a list of items of information (e.g., an address and a type) as to an address. The address is capable of uniquely identifying the port on the network 121, and is, for example, an MAC address, an IP address, or the like. The type is a network type of the port, and is, for example, Ethernet or the like.

FIG. 5E illustrates an example structure of the volume table 215.

The volume table 215 includes an entry of information as to each of one or more volumes. Each entry corresponds to one of the volumes. Information of the entry includes an ID 2151, a node ID 2152, host information 2153, and a block mapping list 2154.

The ID 2151 is a value capable of uniquely identifying the volume. The node ID 2152 is an ID of the node 101 that has control over (e.g., access to) the volume. The host information 2153 is information (e.g., an ID) as to a host (e.g., a client to which the volume is provided) using the volume. The block mapping list 2154 is a list of items of information (e.g., links to entries in the block mapping table 216) corresponding to a whole logical region of the volume.

FIG. 5F illustrates an example structure of the block mapping table 216.

The block mapping table 216 includes an entry of information as to each of a plurality of block mappings. Each entry corresponds to one of the block mappings. Information of the entry includes an ID 2161, a logical region list 2162, and a physical region list 2163.

The ID 2161 is a value capable of uniquely identifying the block mapping. The logical region list 2162 is a list of items of information as to each of a plurality of logical regions, and information as to one logical region (e.g., a logical block) may include, for example, information indicating a volume ID corresponding to the logical region, a logical block address (LBA) within the volume, and a logical block size. The physical region list 2163 is a list of items of information as to each of a plurality of physical regions, and information as to one physical region (e.g., a physical block) may include information indicating the ID of the permanent storage device corresponding to the physical region, a physical block address, a physical block size, and a data protection type (e.g., RAID 1/5/6).

FIG. 5G illustrates an example structure of the metadata table 217.

The metadata table 217 includes an entry of information as to each of a plurality of items of metadata. Each entry corresponds to one of the items of metadata. Information of the entry includes an ID 2171, a type 2172, a primary node ID 2173, a secondary node ID list 2174, and a metadata mapping list 2175.

The ID 2171 is capable of uniquely identifying the metadata. The type 2172 indicates a type of the metadata. The primary node ID 2173 is the ID of the node 101 that has control over the metadata. The secondary node ID list 2174 includes one or more secondary node IDs, and each secondary node ID is the ID of the node 101 in which the metadata can be redundantly stored. The metadata mapping list 2175 is a list of items of information (e.g., links to entries in the metadata mapping table 218) as to each of a plurality of metadata mappings. Details of the information as to the metadata mappings will be described below.

FIG. 5H illustrates an example structure of the metadata mapping table 218.

The metadata mapping table 218 includes an entry of information as to each of a plurality of metadata mappings. Each entry corresponds to one of the metadata mappings. Information of the entry includes an ID 2181, a metadata ID 2182, and a physical region list 2183.

The ID 2181 is a value capable of uniquely identifying the metadata mapping. The metadata ID 2182 is an ID of the metadata corresponding to the metadata mapping. The physical region list 2183 is a list of items of information as to each of a plurality of physical regions, and information as to one physical region (e.g., a physical region in which the metadata is to be stored) may include information indicating the ID of the permanent storage device, a physical block address, a physical block size, a data protection type, and a node ID of an owner (i.e., the node that has control over the metadata). The data protection type is, for example, RAID 1/5/6 or the like. The node ID of the owner is the ID of the node that performs a read process and a write process in conjunction with the permanent storage device using the information as to the physical region.

Examples of processes performed in the present embodiment will be described below.

FIG. 6 illustrates a flow of a user data read process.

When a user data read request has been made from an application (e.g., an application program executed at the host), the user data read process is performed by the user data read process program 311 in the node 101 that has control over a volume specified by this read request. The user data read request may include information necessary for a data read, such as a volume ID, a start position, and a size of a read target.

On the basis of the information of the user data read request, the user data read process program 311 requests a metadata read of the metadata read process program 313 to acquire the metadata (S101). The metadata includes, for example, logical and physical address information of the volume. Details of the metadata read process performed by the metadata read process program 313 will be described below.

The user data read process program 311 performs an address resolution on the basis of the metadata, and identifies the physical region of the read target (S102).

The user data read process program 311 searches the cache in the memory of the node 101 to determine whether the read target data is on the cache (S103).

If the determination at S103 is affirmative (S103: Yes), the user data read process program 311 acquires the target data from the cache (S104).

If the determination at S103 is negative (S103: No), the user data read process program 311 requests a data read of the target data of the storage box 111 having the permanent storage device 114 in which the target data is stored (i.e., which has the physical region identified at S102) (S105), and waits for a result from the storage box 111 (S106). The storage box 111 receives the data read request from the user data read process program 311, and, according to the data read request, performs the data read from the permanent storage device 114 in which the target data is stored on the basis of the permanent storage device table 213 and the port table 214, and returns the read data to the user data read process program 311. The user data read process program 311 stores the data acquired from the storage box 111 in the cache (S107).

The user data read process program 311 returns a result including the acquired data (i.e., a result of the user data read request) to the application (an example of a transmitter of the user data read request) (S108), and finishes the process.

Figure 7:
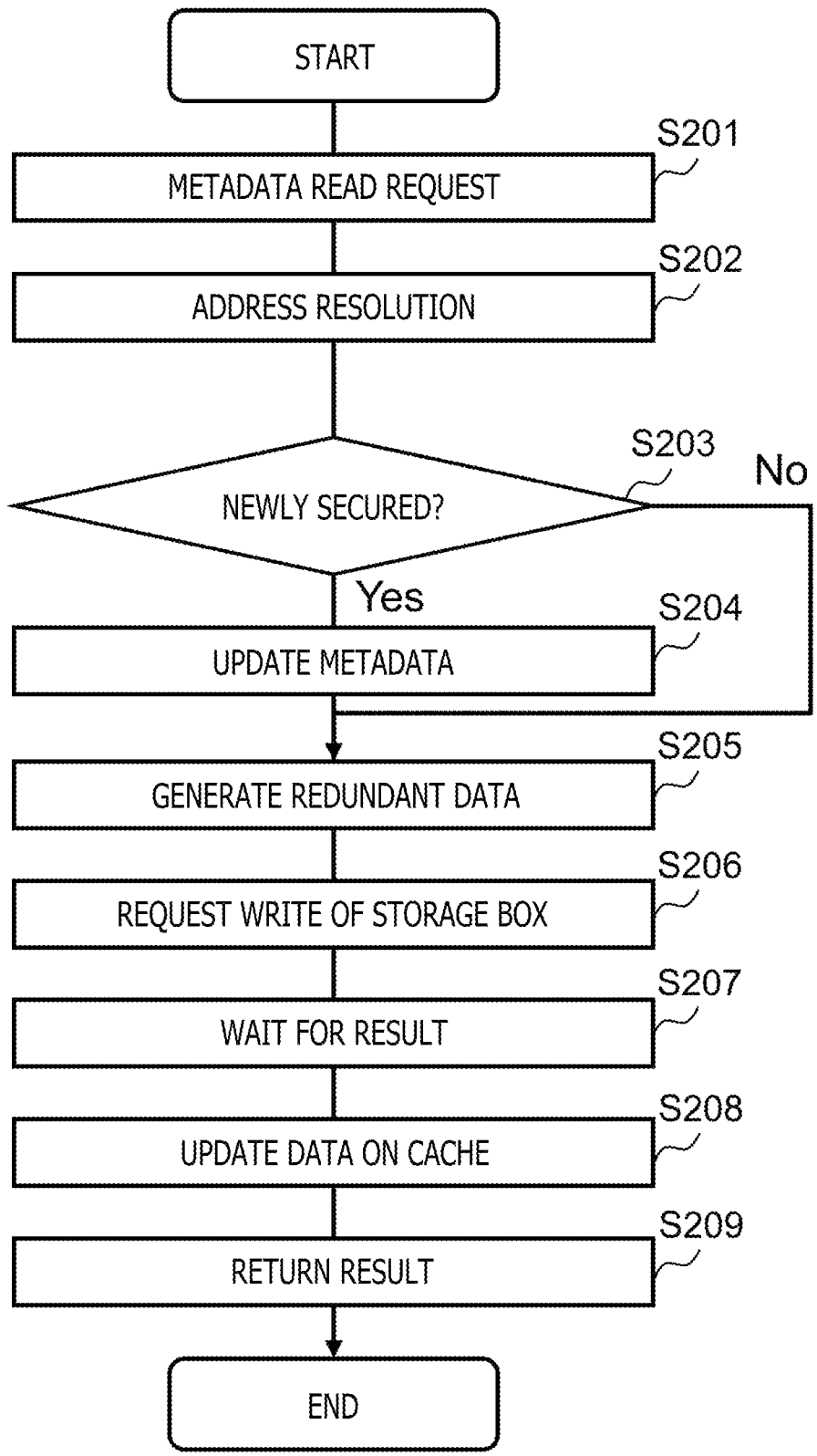
FIG. 7 is a flowchart of a user data write process according to the first embodiment.

FIG. 7 illustrates a flow of a data write process.

When a user data write request has been made from the application, the data write process is performed by the user data write process program 312 in the node 101 that has control over a volume specified by this write request. The data write request may include information necessary for a data write, such as a volume ID, a start position, and a size of a write target.

On the basis of the information of the data write request, the user data write process program 312 requests a metadata read of the metadata read process program 313 (S201) to acquire the metadata. The metadata includes, for example, logical and physical address information of the volume. Details of the metadata read process performed by the metadata read process program 313 will be described below.

The user data write process program 312 performs an address resolution on the basis of the metadata (S202), and identifies the physical region of the write target.

If an allocation of the physical region to the write target in the volume is necessary (S203: Yes), the user data write process program 312 performs the allocation of the physical region, and issues a metadata write request to the metadata write process program 314 to update the metadata, such as logical/physical mapping information about the volume (S204). Details of the metadata write process performed by the metadata write process program 314 will be described below.

The user data write process program 312 produces redundancy of the user data (S205), requests a data write of the target data of the storage box 111 having the physical region for the write target (S206), and waits for a result from the storage box 111 (S207).

According to the data write request from the user data write process program 312, the storage box 111 writes the target data to the permanent storage device 114, and returns a result to the user data write process program 312.

Upon receipt of the returned result, the user data write process program 312 updates the data on the cache (S208). The user data write process program 312 returns a result of the user data write request to the application (S209), and finishes the process.

Figure 8A:
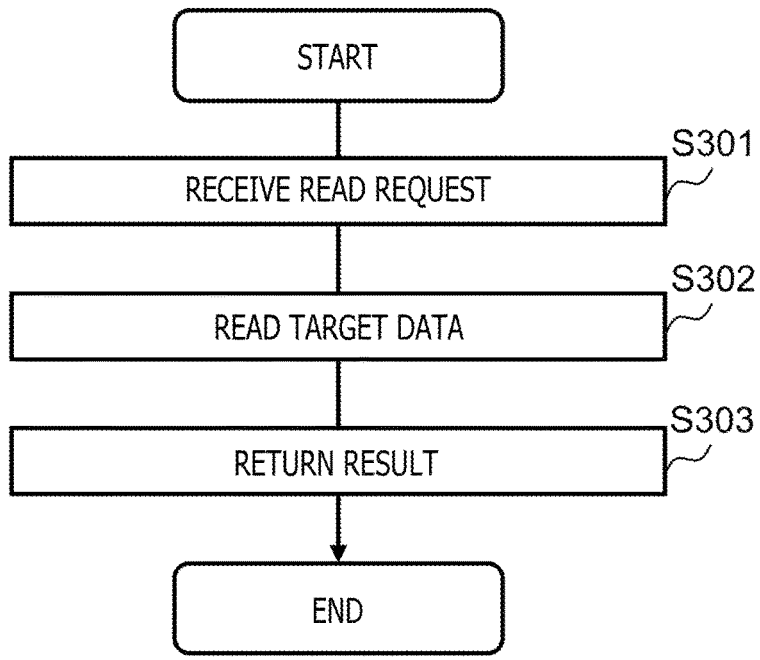
FIG. 8A is a flowchart of a read process performed by the storage box according to the first embodiment.

FIG. 8A illustrates a flow of a read process of the storage box 111.

When a read request to read data (user data or metadata) has been made from any node 101, the read process of the storage box 111 is performed by the read process program 361 in the storage box 111. The read request may include information necessary for the read process.

The read process program 361 receives the read request (S301), and according to the read request, reads the read target data from the permanent storage device 114 (S302), and returns a result to the requester (S303).

Figure 8B:
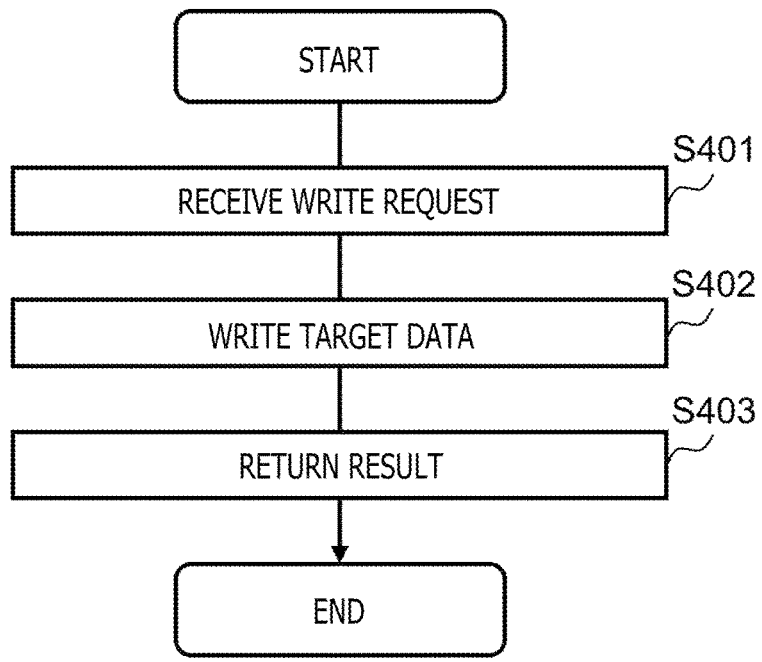
FIG. 8B is a flowchart of a write process performed by the storage box according to the first embodiment.

FIG. 8B illustrates a flow of a write process of the storage box 111.

When a write request to write data (user data or metadata) has been made from any node 101, the write process of the storage box 111 is performed by the write process program 362 in the storage box 111. The write request may include information necessary for the write process.

The write process program 362 receives the write request (S401), and according to the write request, writes the write target data to the permanent storage device 114 (S402), and returns a result to the requester (S403).

Figure 9A:
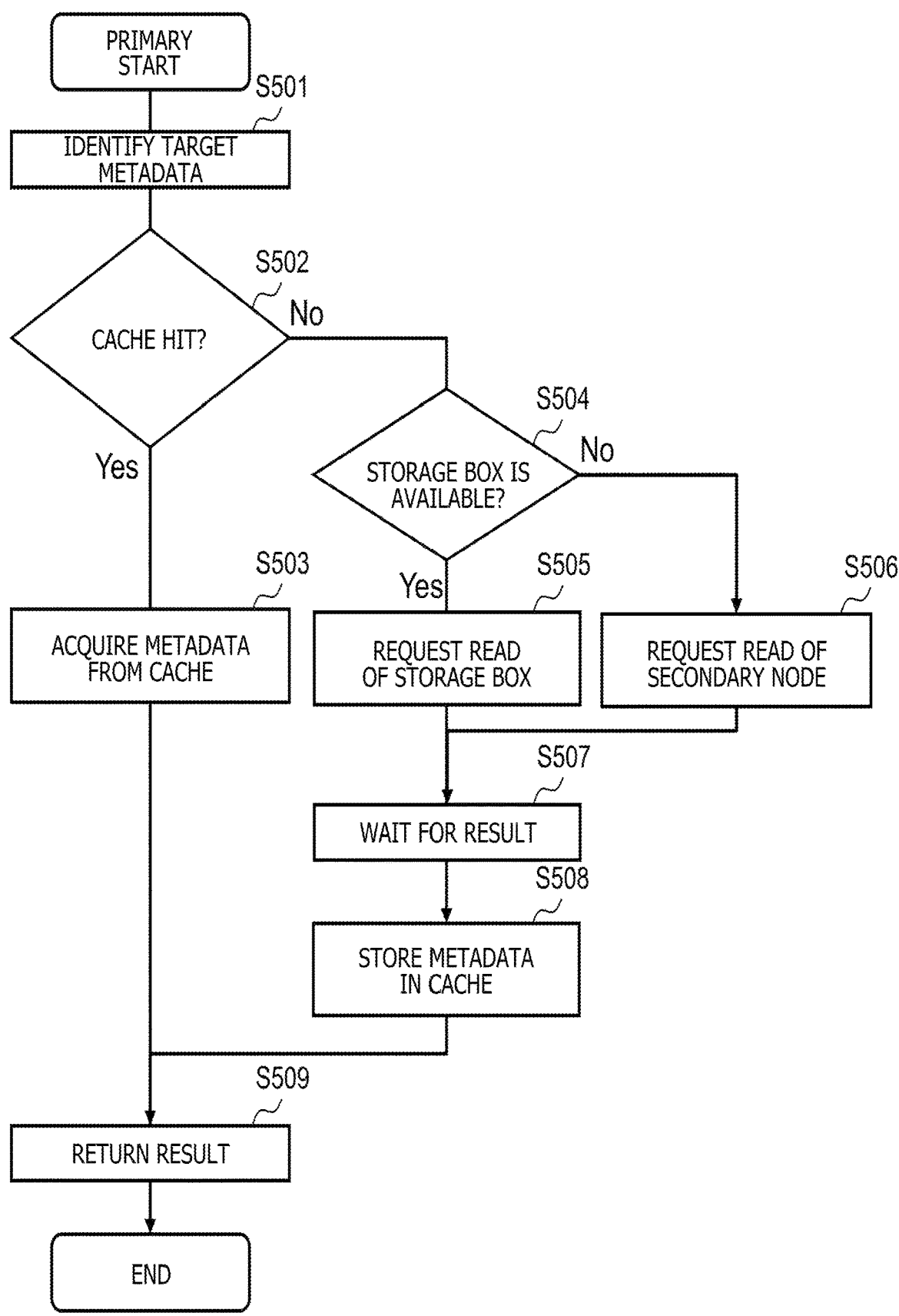
FIG. 9A is a flowchart of a process performed by a primary node in a metadata read process according to the first embodiment.

FIG. 9A illustrates a flow of a process performed by the primary node in the metadata read process. FIG. 9B illustrates a flow of a process performed by the secondary node in the metadata read process.

When a metadata read request has been issued in the user data read process or the user data write process as described above, the metadata read process is performed by the metadata read process program 313. The metadata read request may include information necessary for the metadata read, such as a type and an ID of the metadata.

On the basis of the information of the metadata read request, the metadata read process program 313 identifies the target metadata (S501).

The metadata read process program 313 searches the cache to determine whether the target metadata is on the cache (S502). If the determination at S502 is affirmative (S502: Yes), the metadata read process program 313 acquires the target metadata from the cache (S503).

If the determination at S502 is negative (S502: No), the metadata read process program 313 determines whether the primary node is currently capable of communicating with the storage box 111 having the permanent storage device 114 in which the target metadata is stored (S504). If the determination at S504 is affirmative (S504: Yes), the metadata read process program 313 issues a metadata read request to the storage box 111 (S505), and waits for a result (S507). When the storage box 111 has received the metadata read request from the metadata read process program 313, the storage box 111 reads the target metadata from the permanent storage device 114 in which the target metadata is stored, and returns the target metadata to the metadata read process program 313, according to the request.

If the determinations at S502 and S504 are both negative (S502: No, and S504: No), the metadata read process program 313 issues a metadata read request to the metadata read process program 313 in the secondary node (S506), and waits for a result (S507).

When the metadata read process program 313 in the secondary node has received the metadata read request from the metadata read process program 313 in the primary node (S601), the metadata read process program 313 in the secondary node identifies the target metadata on the basis of the information of the metadata read request, according to the request (S602). The metadata read process program 313 in the secondary node searches the cache (S603). If the target metadata is on the cache (S603: Yes), the metadata read process program 313 in the secondary node acquires the target metadata from the cache (S604), and returns the acquired metadata to the metadata read process program 313 in the primary node (S607). If the target metadata is not on the cache (S603: No), the metadata read process program 313 in the secondary node issues a metadata read request to the storage box 111 (S605) and waits for a result (S606) if the secondary node is currently capable of communicating with the storage box 111 having the permanent storage device 114 in which the target metadata is stored. Thereafter, the metadata read process program 313 in the secondary node receives the target metadata from the storage box 111, stores the metadata in the cache, and returns the metadata to the metadata read process program 313 in the primary node.

The metadata read process program 313 in the primary node stores the metadata acquired from the storage box 111 or the secondary node in the cache (S508). The metadata read process program 313 in the primary node returns, to the requester, the target metadata acquired from the cache at S503 or the target metadata acquired from the cache through S508 (S509) as the result.

Figure 10A:
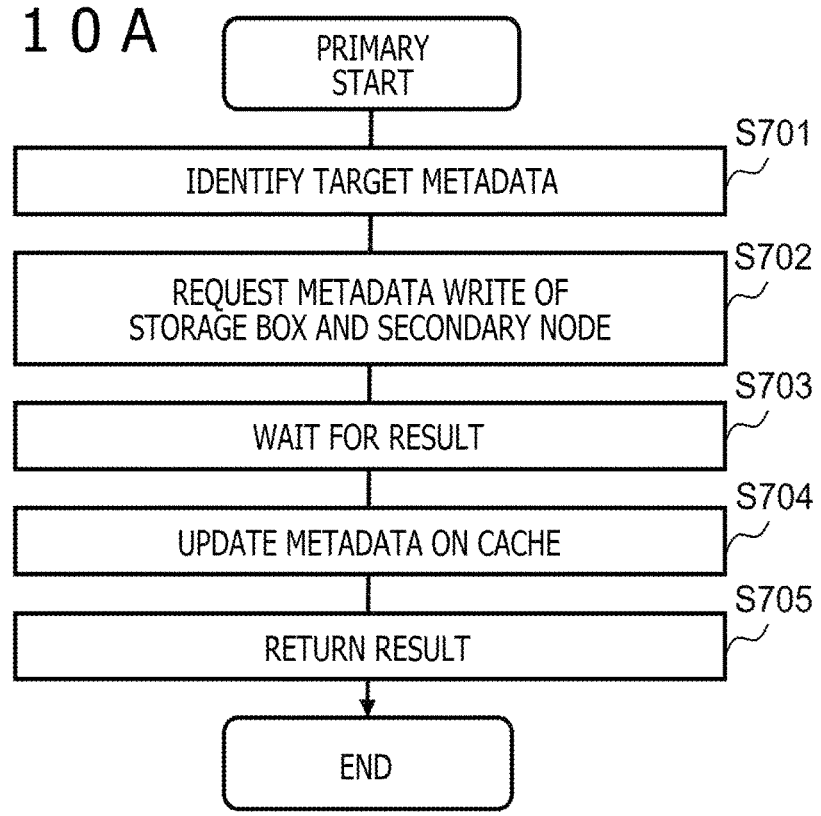
FIG. 10A is a flowchart of a process performed by the primary node in the metadata write process according to the first embodiment.
Figure 10B:
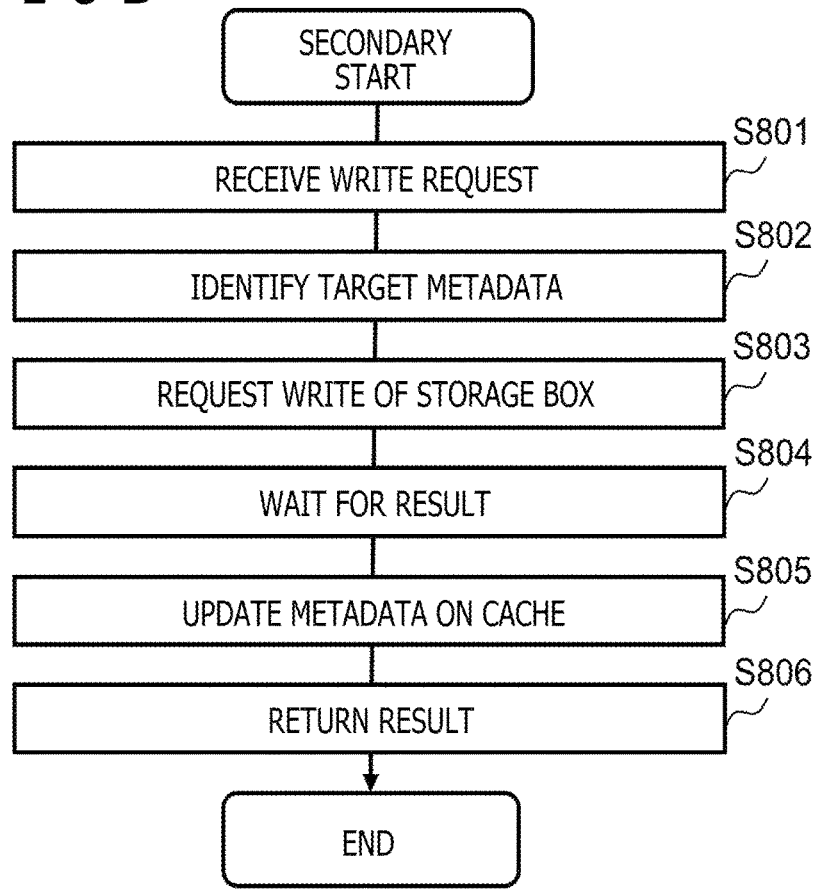
FIG. 10B is a flowchart of a process performed by the secondary node in the metadata write process according to the first embodiment.

FIG. 10A illustrates a flow of a process performed by the primary node in the metadata write process. FIG. 10B illustrates a flow of a process performed by the secondary node in the metadata write process.

When a metadata write request has been issued in the user data read process or the user data write process as described above, the metadata write process is performed by the metadata write process program 314. The metadata write request may include information necessary for a metadata write, such as a type and an ID of the metadata.

On the basis of the information of the metadata write request, the metadata write process program 314 identifies the target metadata (S701).

The metadata write process program 314 requests the metadata write of the target data of the storage box 111 and the secondary node (S702), and waits for results from the storage box 111 and the secondary node (S703).

The metadata write process program 314 in the secondary node receives the metadata write request from the primary node (S801), and identifies the target metadata on the basis of the information of the request (S802). The metadata write process program 314 in the secondary node requests the metadata write of the storage box 111 (S803), and waits for a result (S804), and, after receiving the result, updates the metadata on the cache (S805), and returns the result to the primary node (S806).

When the storage box 111 has received the metadata write requests from the primary node and the secondary node, the storage box 111 writes the target metadata to the corresponding permanent storage devices 114, according to the requests, and returns the results to the requesters.

After receiving the results from the secondary node and the storage box 111, the metadata write process program 314 in the primary node updates the metadata on the cache (S704), and returns the result to the requester (S705).

Figure 11A:
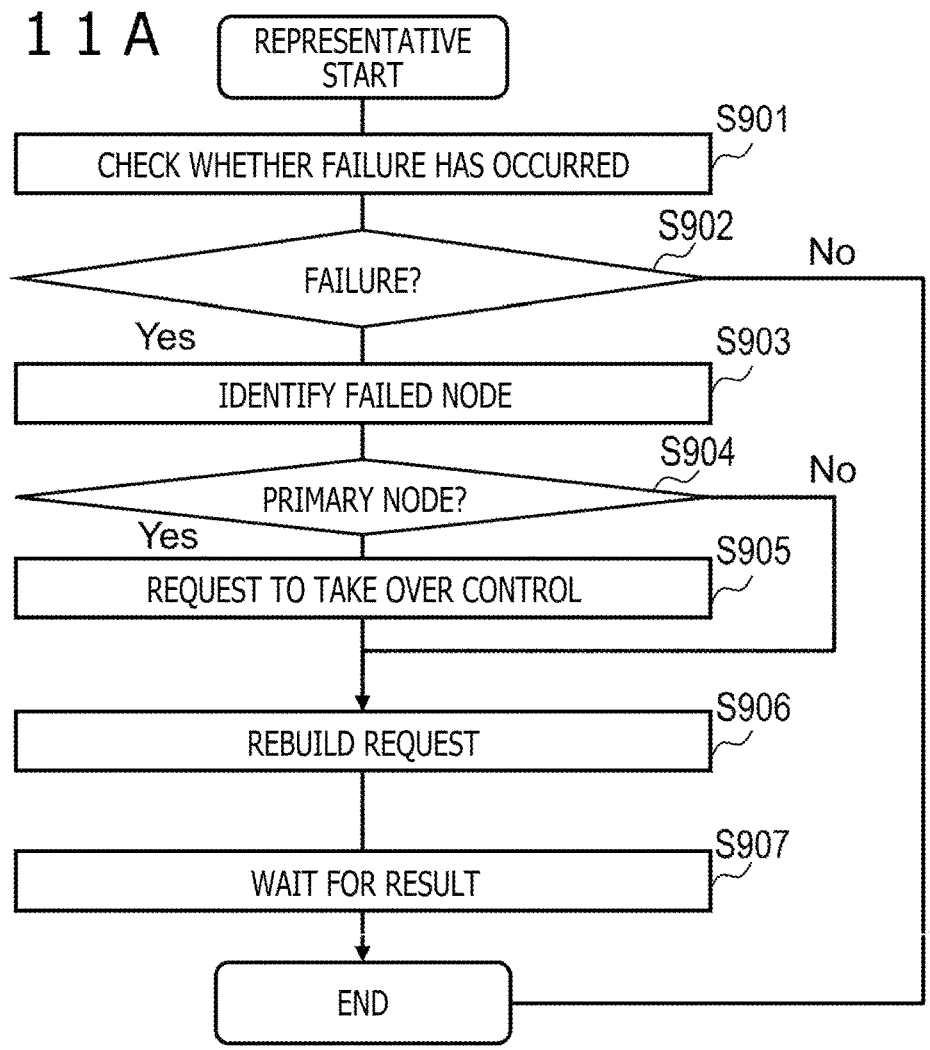
FIG. 11A is a flowchart of a process performed by a representative node in a failover process according to the first embodiment.
Figure 11B:
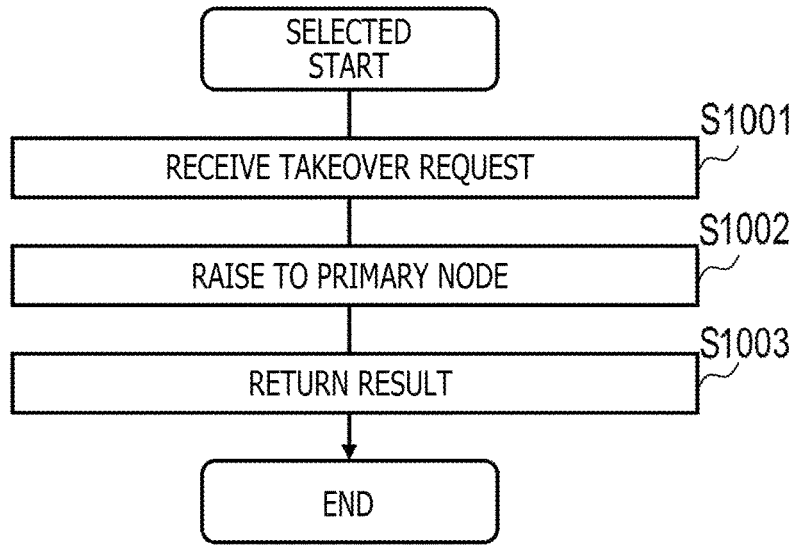
FIG. 11B is a flowchart of a process performed by a selected node in the failover process according to the first embodiment.

FIG. 11A illustrates a flow of a process performed by a representative node in the failover process. FIG. 11B illustrates a flow of a process performed by a selected node in the failover process.

The failover process is a process which, when any node 101 having control over metadata has been closed due to a failure or the like, transfers the control from the node 101 to another, secondary node. This process is performed by a predetermined node in the system or a node determined among the nodes belonging to the redundancy group. Hereinafter, for the sake of convenience, the node that performs, or gives an instruction to perform, the transfer of the control over the metadata may be referred to as the "representative node," and the node to which the control over the metadata is transferred may be referred to as the "selected node."

The failover process program 315 in the representative node periodically checks whether each of the nodes is alive, for example, to check whether a failure has occurred (S901). If a failure has not occurred in any of the nodes (S902: No), this process is finished. If there is a failed node (i.e., a node in which a failure has occurred), the failover process program 315 in the representative node performs the following process.

The failover process program 315 in the representative node identifies the failed node (S903). The failover process program refers to the metadata table 217 and the metadata mapping table 218 to determine whether the failed node is the primary node in any of the redundancy groups (S904). If the determination at S904 is affirmative (S904: Yes), the failover process program 315 selects one of the secondary node(s) belonging to the redundancy group as the selected node (i.e., the node to which a failover is to be performed) on the basis of the metadata table 217 and the metadata mapping table 218, and requests the selected node to take over the control over the metadata (S905). After S905 (or if the determination at S904 is negative (S904: No)), the failover process program 315 in the representative node requests the primary node belonging to the redundancy group to rebuild the metadata (S906).

The failover process program 315 in the representative node waits for a result (S907).

The failover process program 315 in the selected node receives the request to take over the control over the metadata (S1001), raises the selected node to the primary node (S1002), and returns a result to the requester (S1003). The "raise to the primary node" may involve an update of the metadata, such as shifting the ID of the selected node from the secondary node ID list 2174 to the primary node ID 2173, and enable the selected node to operate as the primary node.

The primary node receives a rebuild request from the representative node, and, on the basis of the request, performs the rebuild process, and returns a result to the requester. Details of the rebuild process will be described below. The failover process program 315 in the representative node, waiting for the result at S907, finishes the process after receiving the result.

FIG. 12 illustrates a flow of the rebuild process.

The rebuild process is a process performed when a node or a permanent storage device has failed. In the rebuild process, a copy of the metadata stored in the failed device is transferred from another operable device to yet another device to recover the degree of redundancy of the metadata. The rebuild process is performed by the rebuild process program 316 in the primary node (i.e., the node having control over the metadata).

The rebuild process program 316 in the primary node receives the rebuild request from the representative node (S1101). The rebuild request includes, for example, information indicating the type of the device in which the failure has occurred (e.g., the node or the permanent storage device in any node or storage box), and the ID of the device.

The rebuild process program 316 determines, from the rebuild request, whether the location at which the failure has occurred is a node or a permanent storage device (S1102). If the location at which the failure has occurred is a node (S1102: Yes), the rebuild process program 316 selects one of the secondary node(s) belonging to the redundancy group to which this primary node belongs as the node in which a rebuild is to be performed, i.e., a rebuild target node, on the basis of the metadata table 217 and the metadata mapping table 218 (S1103), transfers the metadata to the rebuild target node, thereby synchronizing the metadata in the memory of the primary node on the memory of the rebuild target node (S1104), and waits for a result (e.g., a response indicating a completion of synchronization) (S1107). Thus, the degree of redundancy of the metadata among the memories of different nodes is recovered. Here, N identical items of metadata (where N is an integer greater than one) are stored in the different nodes (for example, an identical item of metadata is stored in the memory of each of N nodes), and in this case, the degree of redundancy is N.

If the location at which the failure has occurred is a permanent storage device (S1102: No), the rebuild process program 316 selects one of the permanent storage device(s) belonging to the redundancy group to which this primary node belongs as the permanent storage device in which a rebuild is to be performed on the basis of the metadata table 217 and the metadata mapping table 218 (S1105), transmits a metadata write request specifying the permanent storage device in which the rebuild is to be performed to the storage box 111 (S1106), and waits for a result (e.g., a response indicating a completion) (S1107). Thus, the degree of redundancy of the metadata among different permanent storage devices 114 is recovered. Here, M identical items of metadata (where M is an integer greater than one) are stored in the different permanent storage devices 114 (for example, an identical item of metadata is stored in each of M permanent storage devices 114), and in this case, the degree of redundancy is M. The degree of redundancy, N, of the metadata among the nodes may be either equal to or different from the degree of redundancy, M, of the metadata among the permanent storage devices.

After receiving the result, the rebuild process program 316 finishes this process.

Second Embodiment

A second embodiment of the present invention will be described below. Focus of this description is placed on differences from the first embodiment, and features of the second embodiment which are shared with the first embodiment will not be described or will be described only briefly (the same is true of descriptions of third, fourth, and fifth embodiments of the present invention).

In a metadata write process according to the second embodiment, the primary node writes the metadata to the permanent storage device 114, but the secondary node does not write the metadata to the permanent storage device 114. As a result, compared to the first embodiment, a time for metadata communication between the secondary node and the storage box can be eliminated, and a response time for the metadata write request received by the metadata write process program 314 in the primary node can accordingly be shortened.

Figure 13A:
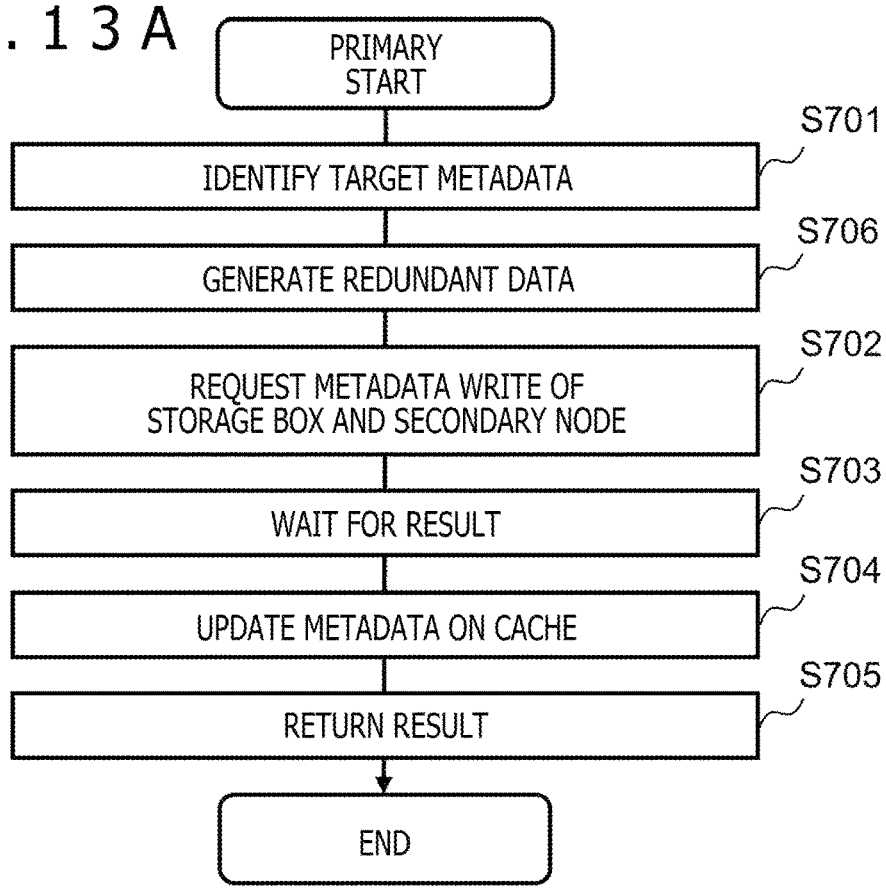
FIG. 13A is a flowchart of a process performed by a primary node in a metadata write process according to a second embodiment of the present invention.
Figure 13B:
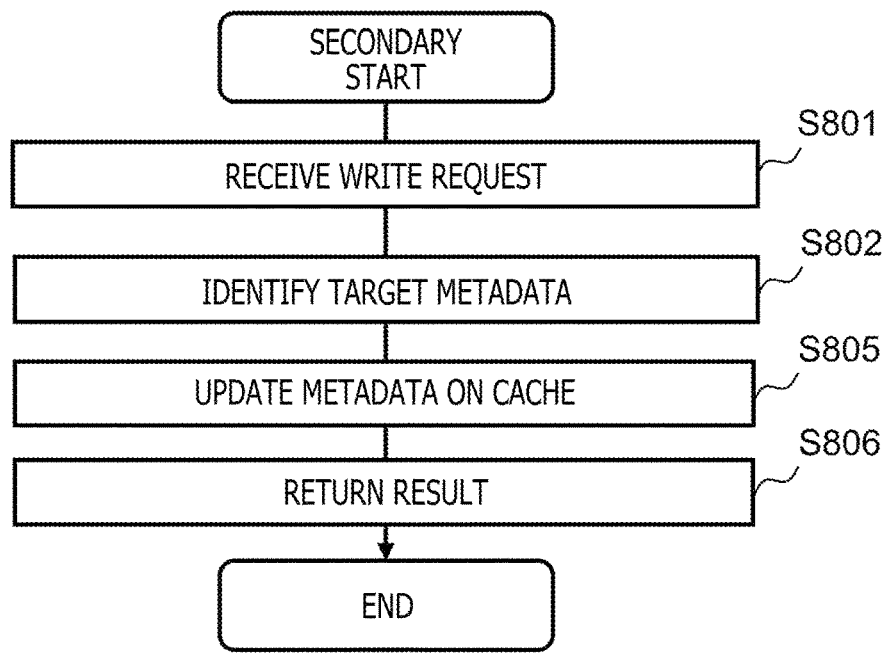
FIG. 13B is a flowchart of a process performed by a secondary node in the metadata write process according to the second embodiment.

FIG. 13A illustrates a flow of a process performed by the primary node in the metadata write process according to the second embodiment. FIG. 13B illustrates a flow of a process performed by the secondary node in the metadata write process according to the second embodiment.

After S701, the metadata write process program 314 in the primary node generates redundant data (S706). As a result, metadata having a redundancy degree of M exists on the cache. A metadata write request transmitted to the storage box(es) at S702 is a write request to write the metadata having a redundancy degree of M. For example, M metadata write requests specifying M permanent storage devices in which the metadata having a redundancy degree of M is to be stored may be transmitted to one or more storage boxes 111.

At S702, the metadata write request is transmitted from the primary node to the secondary node, and the metadata write process program 314 in the secondary node updates the metadata on the cache as with the first embodiment, but does not transmit the metadata write request to the storage box 111. That is, as illustrated in FIG. 13B, out of steps S801 to S806 illustrated in FIG. 10B, the steps other than S803 and S804 are performed.

Third Embodiment

In a metadata write process according to the third embodiment, the primary node transmits the metadata write request(s) only to the storage box(es) 111 without transmitting the metadata write request to the secondary node. When the secondary node has been selected as the node to which a failover is to be performed in the failover process, the secondary node reads the metadata from the storage box 111, and is raised to the primary node. Thus, overhead of a metadata write from the primary node to the secondary node can be eliminated in the metadata write process, and throughput of the metadata write process can be expected to improve.

Figure 14:
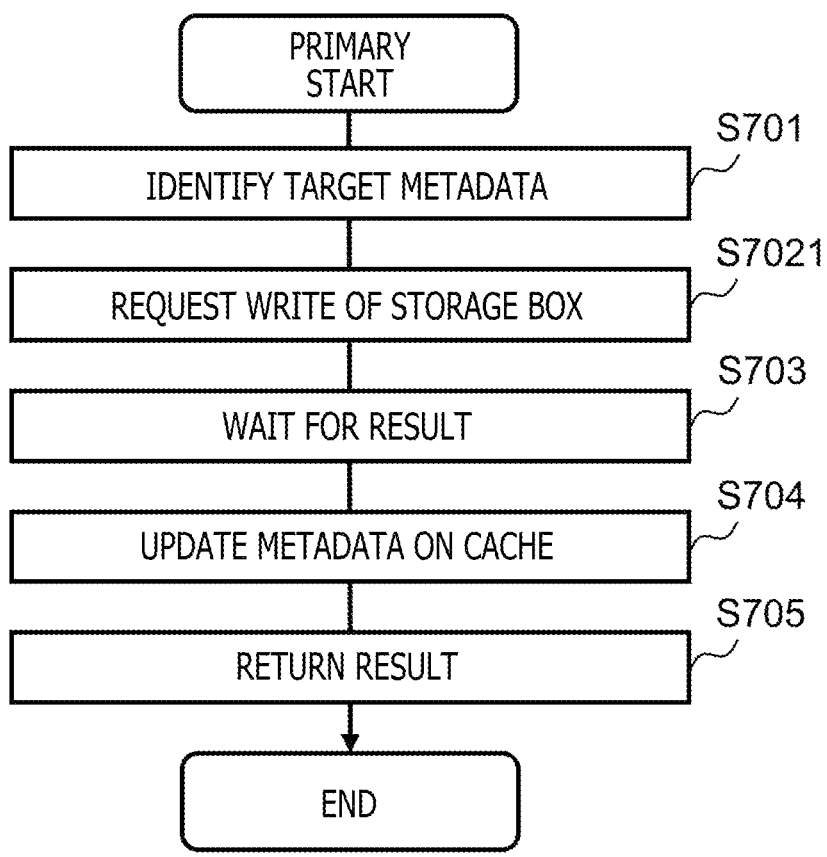
FIG. 14 is a flowchart of a metadata write process according to a third embodiment of the present invention.

FIG. 14 illustrates a flow of the metadata write process according to the third embodiment.

After S701, the metadata write process program 314 in the primary node generates redundant data (i.e., generates metadata having a redundancy degree of M on the cache), and transmits the metadata write request(s) to write the metadata having a redundancy degree of M to the storage box(es) 111 (S7021).

Figure 15:
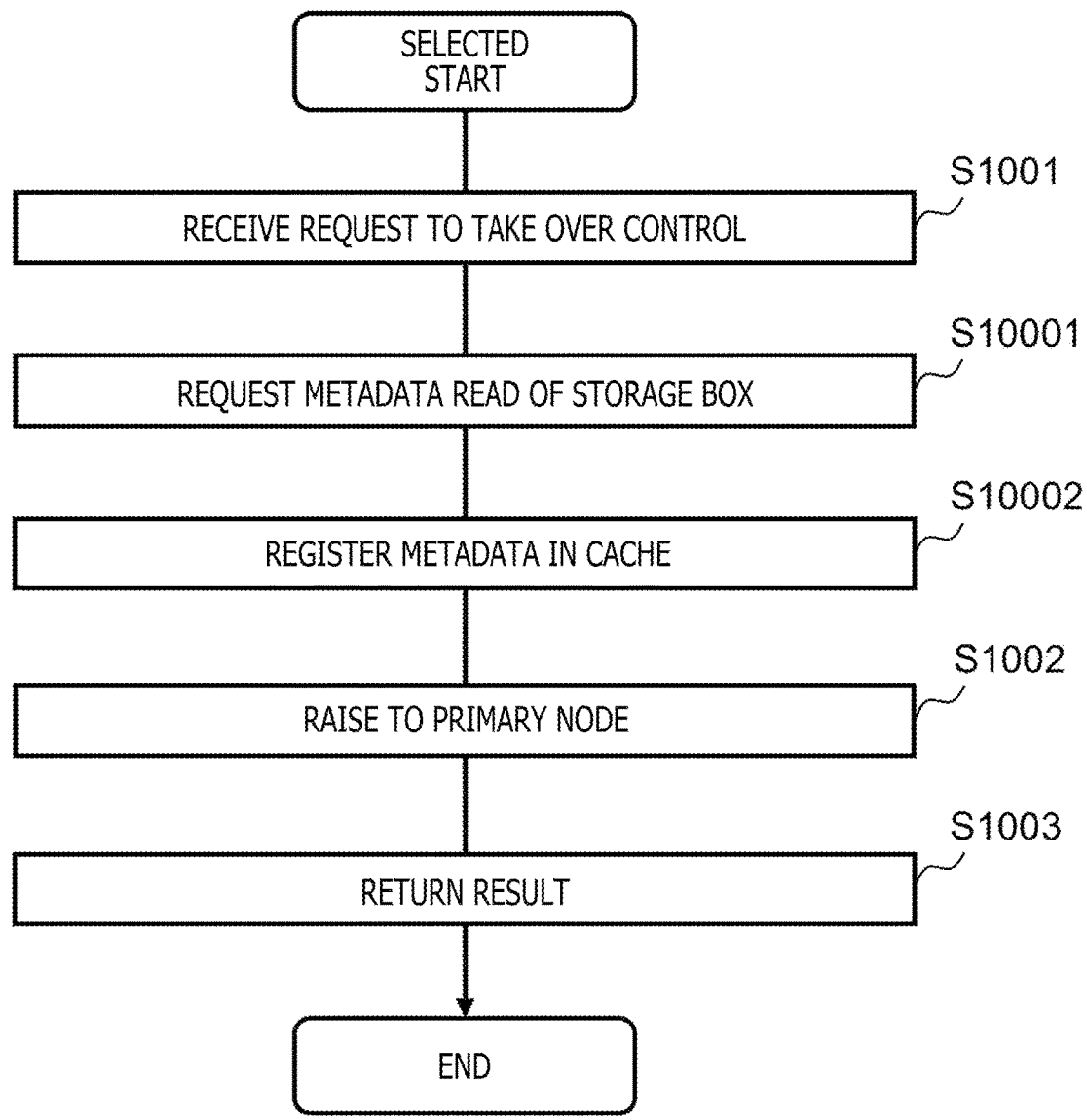
FIG. 15 is a flowchart of a process performed by a selected node in a failover process according to the third embodiment.

FIG. 15 illustrates a flow of a process performed by the selected node in a failover process according to the third embodiment. A process performed by the representative node in the failover process according to the third embodiment will not be described, because this process is the same as the corresponding process in the first embodiment.

After S1001, the failover process program 315 in the selected node transmits a metadata read request to read the metadata from the storage box 111 to the storage box 111 (S10001). The failover process program 315 receives the metadata from the storage box 111 as a response to this request, and registers the metadata in the cache of the selected node (S10002). Thereafter, steps S1002 and S1003 are performed.

Fourth Embodiment

In a metadata write process according to the fourth embodiment, only update information about the metadata is transferred from the primary node to the secondary node in place of the transfer of the metadata to the secondary node. Thereafter, the secondary node reads the target metadata from the storage box, according to the update information, asynchronously to the metadata write process. Thus, as with the second embodiment, the response time for the metadata write request received by the metadata write process program 314 in the primary node can be expected to be shortened.

Figure 16A:
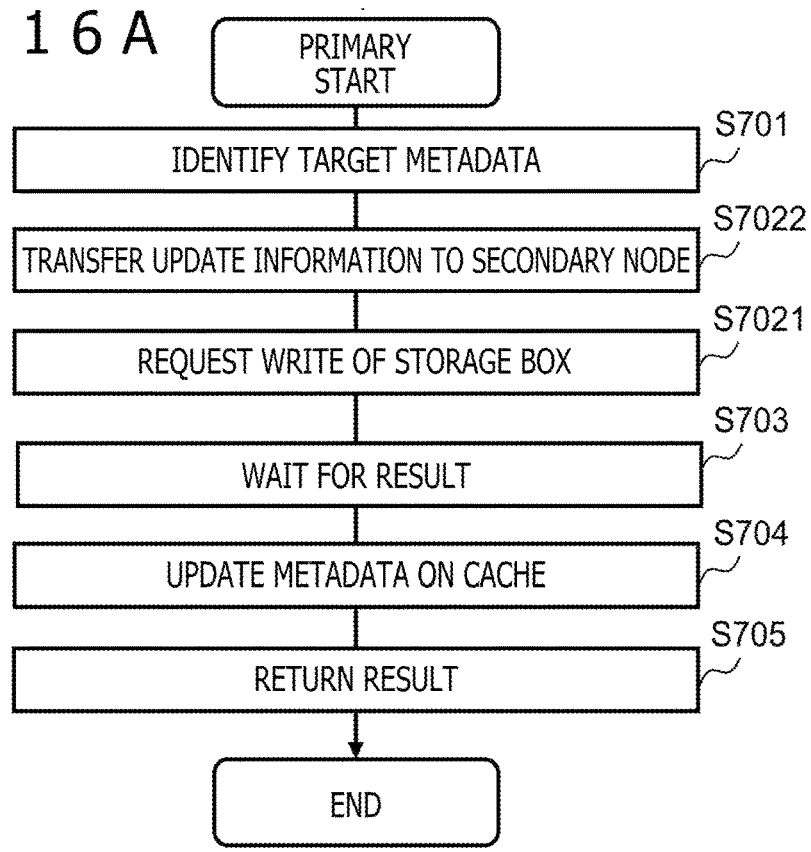
FIG. 16A is a flowchart of a process performed by a primary node in a metadata write process according to a fourth embodiment of the present invention.
Figure 16B:
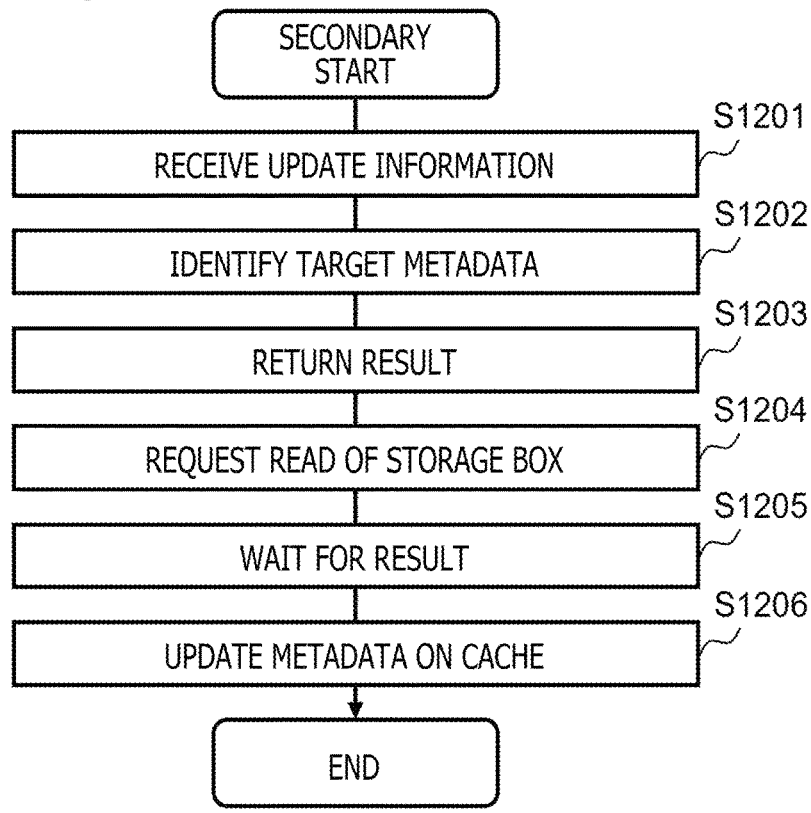
FIG. 16B is a flowchart of a process performed, asynchronously to the metadata write process, by a secondary node according to the fourth embodiment.

FIG. 16A illustrates a flow of a process performed by the primary node in the metadata write process according to the fourth embodiment. FIG. 16B illustrates a flow of a process performed, asynchronously to the metadata write process, by the secondary node according to the fourth embodiment.

After S701, the metadata write process program 314 in the primary node transfers the update information to the secondary node (S7022). The "update information" is information indicating a difference between the updated metadata and the metadata before being updated, and may be, for example, information including the ID of the updated metadata, the address of a region where the data has been updated, and difference data (updated data) of this region. That is, the update information may be information including not the whole of the updated metadata but data corresponding to an updated part thereof. The size of the update information is smaller than the size of the whole of the updated metadata, and therefore, a reduction in the amount of data communication between the primary node and the secondary node can be achieved.

After S7022, the metadata write process program 314 in the primary node performs step S7021, which has been described above in the description of the third embodiment.

The metadata write process program 314 in the secondary node receives the update information about the metadata from the primary node (S1201), identifies the target metadata on the basis of the update information (S1202), and returns a result (e.g., a completion response) to the requester (S1203).

Thereafter, at an optional time, the metadata read process program 313 in the secondary node transmits a metadata read request to the storage box 111 (S1204), and waits for a result (S1205). The read target specified in this metadata read request is based on the update information received at S1201. That is, the read target may not be the whole of the updated metadata but a part (updated part) thereof. The storage box 111 reads the target data (e.g., a part of the updated metadata) from the permanent storage device 114 in response to the metadata read request, and returns a result to the requester. The metadata read process program 313 in the secondary node receives the result from the storage box 111, updates the metadata on the cache using the target data in the result (S1206), and finishes the process.

Fifth Embodiment

In the fifth embodiment, the generation of the metadata having a redundancy degree of M is performed by the storage box 111 instead of the primary node. As a result, a reduction in the number of data transfers between the primary node and the storage box in the metadata write process can be achieved, resulting in a reduced processing load of the metadata write process.

Figure 17:
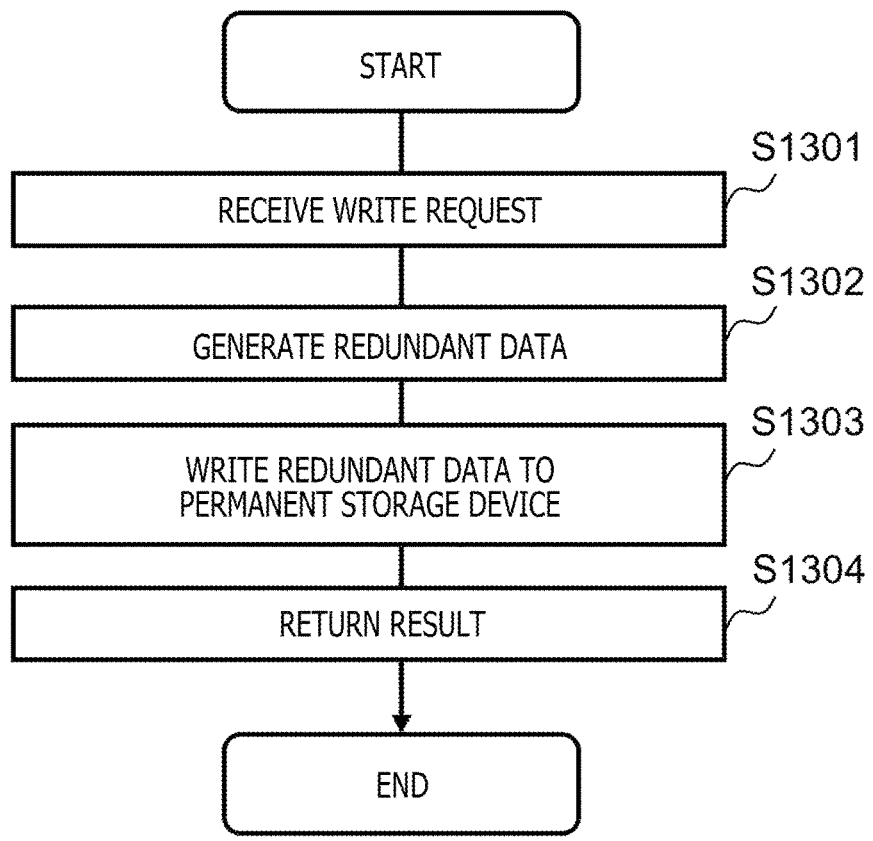
FIG. 17 is a flowchart of a write process performed by a storage box according to a fifth embodiment of the present invention.

FIG. 17 illustrates a flow of a write process performed by the storage box 111 according to the fifth embodiment.

The write process program 362 in the storage box 111 receives a metadata write request from the primary node (S1301). According to this request, the write process program 362 generates redundant data (here, the metadata having a redundancy degree of M) (S1302), writes the metadata having a redundancy degree of M to M permanent storage devices 114, respectively (S1303), and returns a result to the requester (S1304).

Note that this write process may be performed when the storage box 111 has received a metadata write request from the secondary node. Also note that the redundant data generated in this write process may be user data as well as the metadata.

The above-described first to fifth embodiments can be summarized as follows, for example. Note that the following summary description may include descriptions of features that have not been described above (e.g., a supplementary description for the foregoing description and descriptions of modifications of the embodiments).

The scale-out storage system includes the plurality of nodes 101 each having the memory 102 and the CPU 103 (an example of the processor), and the one or more storage boxes 111 (an example of the storage apparatus) having the plurality of permanent storage devices 114 and connected to the plurality of nodes 101. The plurality of nodes have the one or more redundancy groups, each of which is a group for protecting the metadata 10. Each of the one or more redundancy groups has the features described below. In the following description, the redundancy group for the metadata 10A illustrated in FIG. 1 is taken as an example of the redundancy group, but it is to be understood that the following description concerning the redundancy group may be applied to each of the one or more redundancy groups. In addition, it is assumed in the following description that the number of storage boxes 111 is one, and that the one storage box 111 has the plurality of permanent storage devices 114.

The redundancy group includes two or more of the nodes 101 including the primary node 101A being a primary node and the secondary node 101B being a secondary node, and a failover is performed from the primary node 101A to the secondary node 101B.

The metadata 10A (i.e., metadata related to the redundancy group and to be accessed for control, the metadata being stored in the memory 102 of the primary node) is redundantly stored in the different permanent storage devices 114A and 114B in the storage box 111.

The metadata 10A is redundantly stored in the memory 102 of the primary node 101A and the memory 102 of the secondary node 101B.

Thus, proper protection of the metadata in the scale-out storage system can be achieved. For example, since the metadata 10A is redundantly stored in the memories 102 of the nodes 101A and 101B, a failover can be performed on the basis of the metadata 10A2 in the memory 102 of the node 101B. Moreover, even if the metadata 10A is lost in the memories 102 of the nodes 101A and 101B, the metadata 10A can be recovered from the storage box 111. Furthermore, even if a failure occurs in any of the permanent storage devices 114 in the storage box 111, a read of the metadata 10A from the storage box 111 is possible because the metadata 10A is redundantly stored even within the storage box 111.

Typically, each node 101 may be a general-purpose computer. The plurality of nodes 101 may be constructed as software-defined anything (SDx) with each of the plurality of nodes 101 executing predetermined software. A software-defined storage (SDS) or a software-defined data center (SDDC), for example, can be adopted as SDx.

The metadata 10A in the node 101A is updated as appropriate. The metadata 10A is updated, for example, when the node 101A has written user data to the storage box 111 in response to a write request to write the user data, when the user data has been moved between the permanent storage devices 114 (for example, between the storage boxes 111), or when the configuration of the storage system has been changed (for example, when a node 101 has been added or removed, or when a volume has been added).

Figure 18:
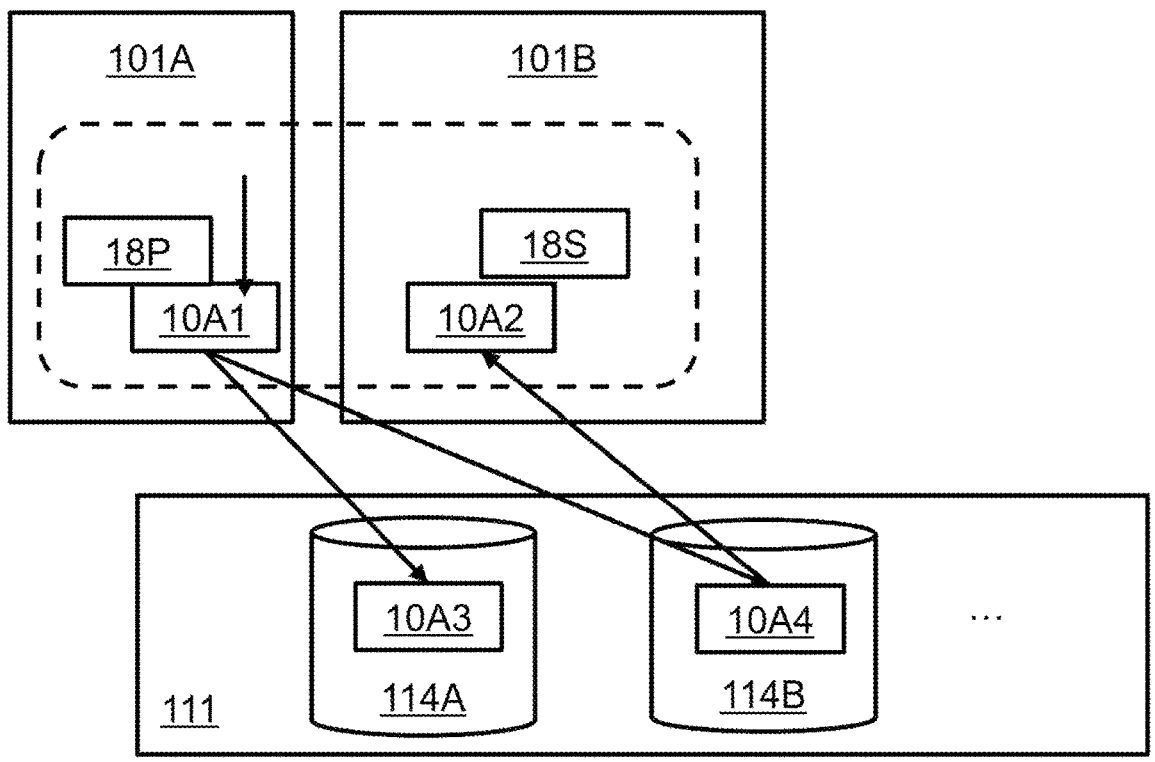
FIG. 18 illustrates an outline of the metadata write process according to the third embodiment.

As illustrated in FIG. 18, the redundancy group may be a group to which two or more control programs 18 in two or more of the nodes 101 belong. The two or more control programs 18 may include one primary (active) control program 18P, and one or more secondary (standby) control programs 18S. Each control program 18 may be a program including the above-described programs 311 to 316. The metadata 10 may be data to be accessed in control performed by the CPU 103 of any of the nodes 101 executing any of the two or more control programs 18. When a failure has occurred in the node 101A (an example of any of the nodes 101), in each of one or more of the redundancy groups in which the node 101A is the primary node, a failover may be performed from the control program 18P in the primary node to the control program 18S in the secondary node on the basis of the metadata 10 related to the redundancy group and stored in the memory 102 of the secondary node. In the case of this configuration, the primary (active) control programs 18 can be distributed among the plurality of nodes 101 since each redundancy group has a different primary node.

For example, in the first embodiment, in response to an update request to update the metadata 10A, the following processes are performed to accomplish redundancy of the metadata updated in the storage box 111 and redundancy of the metadata updated among the memories. This eliminates the need to install a permanent storage device to permanently store the metadata 10A in each of the nodes 101A and 101B.

- The node 101A transmits, to the storage box 111, a first write request to store the updated metadata 10A1 in the memory of the node 101A (or the difference between the updated metadata and the metadata before being updated) in a first storage region based on one or more of the permanent storage devices 114 including the permanent storage device 114A (an example of a first permanent storage device). Here, the "first storage region" may be, for example, a storage region provided by the permanent storage device 114A alone, or a storage region (e.g., a volume or a region allocated to a volume) based on two or more of the permanent storage devices 114 including the permanent storage device 114A.
- The node 101A transmits, to the node 101B, a second write request to store the updated metadata 10A1 in the memory 102 of the node 101A (or the difference between the updated metadata and the metadata before being updated) in the memory 102 of the node 101B.
- The node 101B transmits, to the storage box 111, a third write request to store the updated metadata 10A2 in the memory 102 of the node 101B (or the difference between the updated metadata and the metadata before being updated) in a second storage region based on one or more of the permanent storage devices including the permanent storage device 114B (an example of a second permanent storage device). Here, the "second storage region" may be, for example, a storage region provided by the permanent storage device 114B alone, or a storage region (e.g., a volume or a region allocated to a volume) based on two or more of the permanent storage devices 114 including the permanent storage device 114B.

In the first embodiment, the node 101B may store data (e.g., the updated data or the difference between the updated data and the data before being updated) accompanying the second write request in the memory 102 of the node 101B, and, when a completion response for the third write request has been received from the storage box 111, return a completion response for the second write request to the node 101A. When the node 101A has received a completion response for the first write request from the storage box 111, and has received the completion response for the second write request from the node 101B, the node 101A may issue a completion response for the update request. Thus, a process (i.e., the metadata write process) that follows the update request is completed after the redundancy of the metadata among the permanent storage devices 114A and 114B and the redundancy of the metadata among the memories 102 of the nodes 101A and 101B are accomplished.

In addition, in the third embodiment, for example, as illustrated in FIG. 18, in response to an update request to update the metadata in the node 101A, the node 101A transmits, to the storage box 111, one or more write requests to write the updated metadata 10A1 in the memory 102 of the node 101A (or the difference between the updated metadata and the metadata before being updated), whereby the updated metadata (10A3 and 10A4) is redundantly stored in the different permanent storage devices 114A and 114B. Then, at the time of a failover, the node 101B reads the updated metadata from the storage box 111 (e.g., the permanent storage device 114B) into the memory 102 of the node 101B. Thus, the updated metadata (or the aforementioned difference) can be written to the permanent storage devices 114A and 114B in parallel, and therefore, a time required for a process (i.e., the metadata write process) that follows the update request can be expected to be shortened, and the redundancy of the metadata among the memories 102 of the nodes 101A and 101B can be accomplished at least at the time of the failover.

In the third embodiment, the node 101A may issue a completion response for the update request when the node 101A has received a completion response for each of the one or more write requests from the storage box 111. Thus, the process that follows the update request is completed without communication between the nodes 101A and 101B or communication between the node 101B and the storage box 111, and therefore, the time required for this process can be expected to be shortened.

Figure 19:
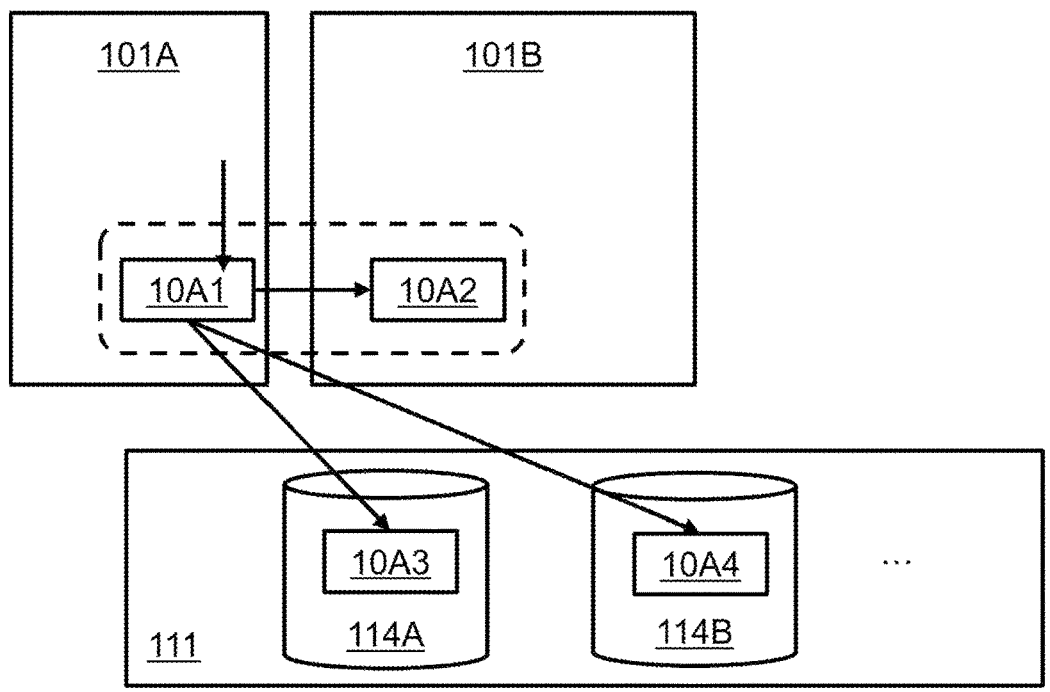
FIG. 19 illustrates an outline of the metadata write process according to the second embodiment.

In addition, in the second embodiment, for example, as illustrated in FIG. 19, in response to an update request to update the metadata in the node 101A, the following processes are performed to accomplish redundancy of the metadata updated in the storage box 111 and redundancy of the metadata updated among the memories 102. Thus, the updated metadata (or the aforementioned difference) can be written to the permanent storage devices 114A and 114B in parallel, and therefore, a time required for a process (i.e., the metadata write process) that follows the update request can be expected to be shortened, while the redundancy of the metadata among the memories 102 of the nodes 101A and 101B can be accomplished.

- The node 101A transmits, to the storage box 111, one or more write requests to write the updated metadata in the memory 102 of the node 101A (or the difference between the updated metadata and the metadata before being updated), whereby the updated metadata is redundantly stored in the different permanent storage devices 114A and 114B.
- The node 101A causes the updated metadata to be reflected in the memory 102 of the node 101B in synchronism with the updating of the metadata in the memory 102 of the node 101A.

In the second embodiment, the node 101A may issue a completion response for the update request when the node 101A has received a completion response for each of the one or more write requests from the storage box 111, and has caused the updated metadata to be reflected in the memory 102 of the node 101B in synchronism with the updating of the metadata in the memory 102 of the node 101A. Thus, synchronization between the memories 102 of the nodes 101A and 101B can be expected to be completed during the write from the node 101A to the storage box 111, and therefore, the time required for the process that follows the update request can be expected to be shortened.

Figure 20:
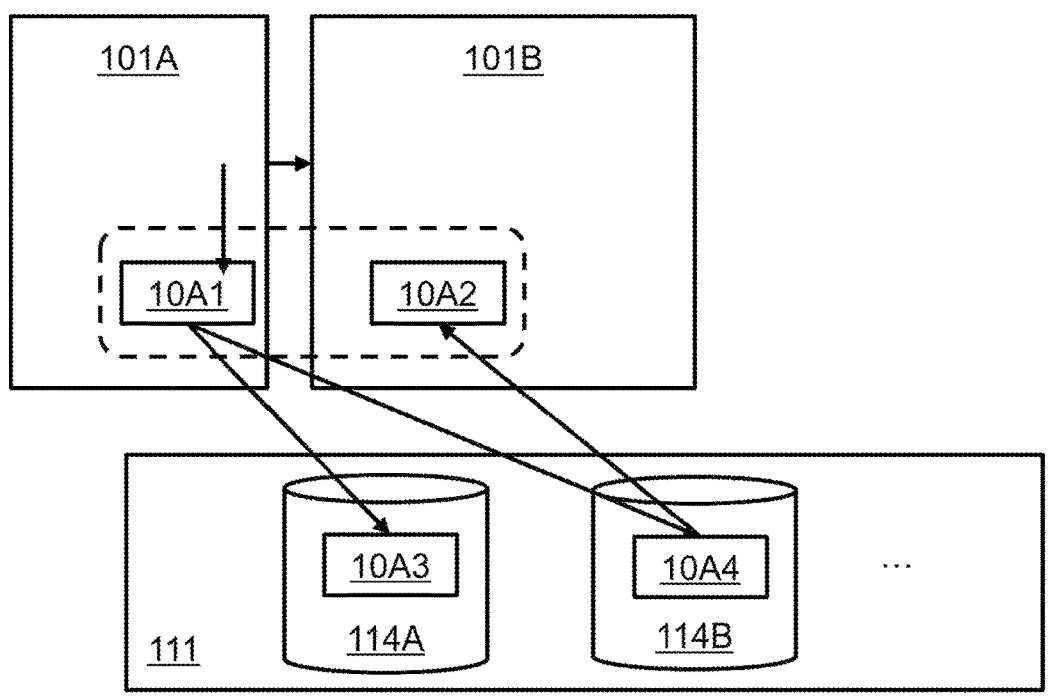
FIG. 20 illustrates an outline of the metadata write process according to the fourth embodiment.

In addition, in the fourth embodiment, for example, as illustrated in FIG. 20, in response to an update request to update the metadata in the node 101A, the node 101A transmits, to the storage box 111, one or more write requests to write the updated metadata in the memory 102 of the node 101A (or the difference between the updated metadata and the metadata before being updated), whereby the updated metadata is redundantly stored in different ones of the permanent storage devices in the storage box 111. In addition, the node 101A transmits, to the node 101B, the update information including information indicating the position of the updated metadata or the aforementioned difference in the storage box 111. Asynchronously to a process that follows the update request, the node 101B reads the updated metadata or the aforementioned difference from the storage box 111 on the basis of the update information, thereby storing the updated metadata in the memory 102 of the node 101B. Thus, a reduction in the amount of data outputted from the node 101A to the node 101B in the process that follows the update request can be achieved, and accordingly, the time required for the process that follows the update request can be expected to be shortened.

In the fourth embodiment, the node 101A may issue a completion response for the update request when the node 101A has received a completion response for each of the one or more write requests from the storage box 111, and has received a predetermined response (e.g., a response indicating an acknowledgment) for the update information from the node 101B. Thus, the process that follows the update request is completed without communication of data having a size greater than that of the update information between the nodes 101A and 101B or between the node 101B and the storage box 111.

For example, in each of the second to fourth embodiments, the redundancy of the metadata among the permanent storage devices 114A and 114B may be accomplished by the node 101A, but in the fifth embodiment, for example, the function of accomplishing the redundancy of the metadata is offloaded to the storage box 111. That is, in response to an update request to update the metadata in the node 101A, the node 101A transmits, to the storage box 111, one write request to write the updated metadata in the memory 102 of the node 101A (or the difference between the updated metadata and the metadata before being updated), and in response to the write request, the storage box 111 (e.g., the write process program 362) produces redundancy of the updated metadata or the difference, whereby the updated metadata is redundantly stored in different ones of the permanent storage devices in the storage box 111. Thus, reductions in the amount of data transfer between the node 101A and the storage box 111 and a load on the node 101A can be achieved. Note that the redundancy of the metadata among the permanent storage devices 114 may be accomplished by a method according to any RAID level (e.g., mirroring or data protection using parity) or erasure coding.

What is claimed is:

1. A scale-out storage system comprising:
a plurality of computer nodes each of which has a memory and a processor; and
a storage apparatus having a plurality of permanent storage devices and connected to the plurality of computer nodes, wherein
the plurality of computer nodes have one or more redundancy groups each of which is a group for metadata protection,
each of the one or more redundancy groups includes two or more of the computer nodes including a primary node being a primary computer node and a secondary node being a secondary computer node, and a failover is performed from the primary node to the secondary node,
the memory of the primary node has stored therein metadata related to the redundancy group and to be accessed for control, and the metadata is redundantly stored in different ones of the permanent storage devices in the storage apparatus, and
the metadata is redundantly stored in the memory of the primary node and the memory of the secondary node, wherein
(a) with respect to each of the one or more redundancy groups, in response to an update request to update the metadata in the primary node, following processes are performed to accomplish redundancy of the metadata updated in the storage apparatus and redundancy of the metadata updated among the memories, the primary node transmits, to the storage apparatus, a first write request to
store the metadata updated in the memory of the primary node or a difference between the updated metadata and the metadata before being updated in a first storage region based on one or more of the permanent storage devices including a first permanent storage device of the storage apparatus, the primary node transmits, to the secondary node, a second write request to store the metadata updated in the memory of the primary node or the difference between the updated metadata and the metadata before being updated in the memory of the secondary node, and
the secondary node transmits, to the storage apparatus, a third write request to store the metadata updated in the memory of the secondary node or a difference between the updated metadata and the metadata before being updated in a second storage region based on one or more of the permanent storage devices including a second permanent storage device of the storage apparatus, or
(b) with respect to each of the one or more redundancy groups, in response to an update request to update the metadata in the primary node, the primary node transmits, to the storage apparatus, one or more write requests to write the metadata updated in the memory of the primary node or a difference between the updated metadata and the metadata before being updated, whereby the updated metadata is redundantly stored in different ones of the permanent storage devices in the storage apparatus, and
at a time of a failover, the secondary node reads the updated metadata from the storage apparatus into the memory of the secondary node.

2. The scale-out storage system according to claim 1, wherein
each of the one or more redundancy groups is a group to which two or more control programs in the two or more computer nodes belong, the metadata is data to be accessed in control performed by the processor of any of the computer nodes executing any of the two or more control programs, and when a failure has occurred in any of the plurality of computer nodes, in each of one or more of the redundancy groups in which the failed computer node is the primary node, a failover is performed from the control program in the primary node to the control program in the secondary node on a basis of the metadata related to the redundancy group and stored in the memory of the secondary node.

3. The scale-out storage system according to claim 1, wherein with respect to each of the one or more redundancy groups in (a), the secondary node stores data accompanying the second write request in the memory of the secondary node, and, when a completion response for the third write request has been received from the storage apparatus, returns a completion response for the second write request to the primary node, and when the primary node has received a completion response for the first write request from the storage apparatus, and has received the completion response for the second write request from the secondary node, the primary node issues a completion response for the update request.

4. The scale-out storage system according to claim 1, wherein with respect to each of the one or more redundancy groups in (b), the primary node issues a completion response for the update request when the primary node has received a completion response for each of the one or more write requests from the storage apparatus.

5. The scale-out storage system according to claim 1, wherein with respect to each of the one or more redundancy groups, in response to an update request to update the metadata in the primary node, following processes are performed to accomplish redundancy of the metadata updated in the storage apparatus and redundancy of the metadata updated among the memories, the primary node transmits, to the storage apparatus, one or more write requests to write the metadata updated in the memory of the primary node or a difference between the updated metadata and the metadata before being updated, whereby the updated metadata is redundantly stored in different ones of the permanent storage devices in the storage apparatus, and the primary node causes the updated metadata to be reflected in the memory of the secondary node in synchronism with the updating of the metadata in the memory of the primary node.

6. The scale-out storage system according to claim 5, wherein with respect to each of the one or more redundancy groups, the primary node issues a completion response for the update request when the primary node has received a completion response for each of the one or more write requests from the storage apparatus, and has caused the updated metadata to be reflected in the memory of the secondary node in synchronism with the updating of the metadata in the memory of the primary node.

7. The scale-out storage system according to claim 1, wherein with respect to each of the one or more redundancy groups, in response to an update request to update the metadata in the primary node, following processes are performed to accomplish redundancy of the metadata updated in the storage apparatus, the primary node transmits, to the storage apparatus, one write request to write the metadata updated in the memory of the primary node or a difference between the updated metadata and the metadata before being updated, and in response to the write request, the storage apparatus produces redundancy of the updated metadata or the difference, whereby the updated meta data is redundantly stored in different ones of the permanent storage devices in the storage apparatus.

8. A scale-out storage system comprising:

a plurality of computer nodes each of which has a memory and a processor; and a storage apparatus having a plurality of permanent storage devices and connected to the plurality of computer nodes, wherein the plurality of computer nodes have one or more redundancy groups each of which is a group for metadata protection, each of the one or more redundancy groups includes two or more of the computer nodes including a primary node being a primary computer node and a secondary node being a secondary computer node, and a failover is performed from the primary node to the secondary node, the memory of the primary node has stored therein metadata related to the redundancy group and to be accessed for control, and the metadata is redundantly stored in different ones of the permanent storage devices in the storage apparatus, and the metadata is redundantly stored in the memory of the primary node and the memory of the secondary node, wherein with respect to each of the one or more redundancy groups, in response to an update request to update the metadata in the primary node, the primary node transmits, to the storage apparatus, one or more write requests to write the metadata updated in the memory of the primary node or a difference between the updated metadata and the metadata before being updated, whereby the updated metadata is redundantly stored in different ones of the permanent storage devices in the storage apparatus, and the primary node transmits, to the secondary node, update information including information indicating a position of the updated metadata or the difference in the storage apparatus, and asynchronously to a process that follows the update request, the secondary node reads the updated metadata or the difference from the storage apparatus on a basis of the update information, thereby storing the updated metadata in the memory of the secondary node.

9. The scale-out storage system according to claim 8, wherein with respect to each of the one or more redundancy groups, the primary node issues a completion response for the update request when the primary node has received a completion response for each of the one or more write requests from the storage apparatus, and has received a predetermined response for the update information from the secondary node.

10. A storage control method implemented by a plurality of computer nodes connected to a storage apparatus having a plurality of permanent storage devices, each computer node having a memory and a processor, wherein the plurality of computer nodes have one or more redundancy groups, each of the one or more redundancy groups includes two or more of the computer nodes including a primary node being a primary computer node and a secondary node being a secondary computer node, and a failover is performed from the primary node to the secondary node, and with respect to each of the one or more redundancy groups, the memory of the primary node has stored therein metadata related to the redundancy group and to be accessed for control, and the metadata is redundantly stored in different ones of the permanent storage devices in the storage apparatus, and the metadata is redundantly stored in the memory of the primary node and the memory of the secondary node, wherein (a) with respect to each of the one or more redundancy groups, in response to an update request to update the metadata in the primary node, following processes are performed to accomplish redundancy of the metadata updated in the storage apparatus and redundancy of the metadata updated among the memories, the primary node transmits, to the storage apparatus, a first write request to store the metadata updated in the memory of the primary node or a difference between the updated metadata and the metadata before being updated in a first storage region based on one or more of the permanent storage devices including a first permanent storage device of the storage apparatus, the primary node transmits, to the secondary node, a second write request to store the metadata updated in the memory of the primary node or the difference between the updated metadata and the metadata before being updated in the memory of the secondary node, and the secondary node transmits, to the storage apparatus, a third write request to store the metadata updated in the memory of the secondary node or a difference between the updated metadata and the metadata before being updated in a second storage region based on one or more of the permanent storage devices including a second permanent storage device of the storage apparatus, or (b) with respect to each of the one or more redundancy groups, in response to an update request to update the metadata in the primary node, the primary node transmits, to the storage apparatus, one or more write requests to write the metadata updated in the memory of the primary node or a difference between the updated metadata and the metadata before being updated, whereby the updated metadata is redundantly stored in different ones of the permanent storage devices in the storage apparatus, and at a time of a failover, the secondary node reads the updated metadata from the storage apparatus into the memory of the secondary node.

* * * * *